(12) United States Patent
Yasui et al.

(10) Patent No.: US 10,138,960 B2
(45) Date of Patent: Nov. 27, 2018

(54) ELECTRIC BRAKING DEVICE FOR VEHICLE

(71) Applicant: ADVICS CO., LTD., Kariya-shi, Aichi-ken (JP)

(72) Inventors: Yoshiyuki Yasui, Nagoya (JP); Shinichiro Yukoku, Seto (JP); Naomi Emura, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 71 days.

(21) Appl. No.: 15/101,281

(22) PCT Filed: Dec. 4, 2014

(86) PCT No.: PCT/JP2014/082136
§ 371 (c)(1),
(2) Date: Jun. 2, 2016

(87) PCT Pub. No.: WO2015/083798
PCT Pub. Date: Jun. 11, 2015

(65) Prior Publication Data
US 2017/0234380 A1    Aug. 17, 2017

(30) Foreign Application Priority Data

Dec. 5, 2013  (JP) .................................. 2013-251763

(51) Int. Cl.
*F16D 63/00*   (2006.01)
*F16D 65/18*   (2006.01)
(Continued)

(52) U.S. Cl.
CPC .......... *F16D 63/006* (2013.01); *B60T 13/741* (2013.01); *F16D 55/226* (2013.01);
(Continued)

(58) Field of Classification Search
CPC .......... F16D 65/18; F16D 65/14; F16D 65/54; F16D 63/006; F16D 55/226; F16D 2121/24
See application file for complete search history.

(56) References Cited

U.S. PATENT DOCUMENTS 4,540,066 A * 9/1985 Evans ..................... F16D 65/18
188/196 BA
6,915,883 B2 * 7/2005 Watanabe ............... B60T 1/005
188/156

(Continued)

FOREIGN PATENT DOCUMENTS

DE       100 54 474 C1   2/2002
EP          1460301 A2   9/2004
(Continued)

OTHER PUBLICATIONS

International Search Report (PCT/ISA/210) dated Mar. 10, 2015, by the Japanese Patent Office as the International Searching Authority for International Application No. PCT/JP2014/082136.
(Continued)

*Primary Examiner* — Bradley T King
*Assistant Examiner* — James L Hsiao
(74) *Attorney, Agent, or Firm* — Buchanan Ingersoll & Rooney PC

(57) ABSTRACT

The present invention is provided with a power transmission member rotatably supported by a caliper, and a ratchet wheel fixed by the member. A first linear direction movement of a pawl member that engages with a mobile member of a solenoid is guided by a guide member fixed by the caliper. The pawl member is continuously pressed in a release direction by an elastic member. The interlocking force in an interlocking direction, imparted by mobile member of the solenoid mobile member to the pawl member, and the release force in the release direction, which is imparted by (Continued)

State in which interlocking between pawl member TSU and ratchet wheel RCH is canceled (state in which TSU is pressed against release position Pkj)

the elastic member to the pawl member oppose each other, and the interlocking force is larger than the release force. The pawl member and the mobile member move linearly together in one of the interlocking direction and the release direction.

5 Claims, 14 Drawing Sheets

(51) Int. Cl.
    *B60T 13/74*     (2006.01)
    *F16D 55/226*     (2006.01)
    *F16D 121/24*     (2012.01)
    *F16D 125/40*     (2012.01)
    *F16D 125/48*     (2012.01)
    *F16D 125/52*     (2012.01)
    *F16D 127/06*     (2012.01)
    *F16D 129/08*     (2012.01)

(52) U.S. Cl.
    CPC .......... *F16D 65/18* (2013.01); *F16D 2121/24* (2013.01); *F16D 2125/40* (2013.01); *F16D 2125/48* (2013.01); *F16D 2125/52* (2013.01); *F16D 2127/06* (2013.01); *F16D 2129/08* (2013.01)

(56) References Cited

U.S. PATENT DOCUMENTS

| | | | |
|---|---|---|---|
| 2003/0066719 | A1 | 4/2003 | Watanabe et al. |
| 2005/0217952 | A1* | 10/2005 | Usui ...................... F16D 65/18 188/265 |
| 2006/0208565 | A1 | 9/2006 | O'Neill |
| 2010/0051395 | A1* | 3/2010 | Sano ...................... B60T 1/005 188/162 |
| 2014/0069750 | A1 | 3/2014 | Nohira et al. |
| 2014/0152422 | A1* | 6/2014 | Breed ................ G06K 9/00369 340/5.52 |

FOREIGN PATENT DOCUMENTS

| | | |
|---|---|---|
| JP | 2003-042199 A | 2/2003 |
| JP | 2008-532851 A | 8/2008 |
| WO | 02/36398 A2 | 5/2002 |
| WO | WO 2006/101662 A1 | 9/2006 |
| WO | WO 2012/161204 A1 | 11/2012 |
| WO | 2014/084375 A1 | 6/2014 |

OTHER PUBLICATIONS

Written Opinion (PCT/ISA/237) dated Mar. 10, 2015, by the Japanese Patent Office as the International Searching Authority for International Application No. PCT/JP2014/082136.

The extended European Search Report dated Jun. 22, 2017, by the European Patent Office in corresponding European Patent Application No. 14868245.3 (6 pgs).

* cited by examiner

[FIG. 1]
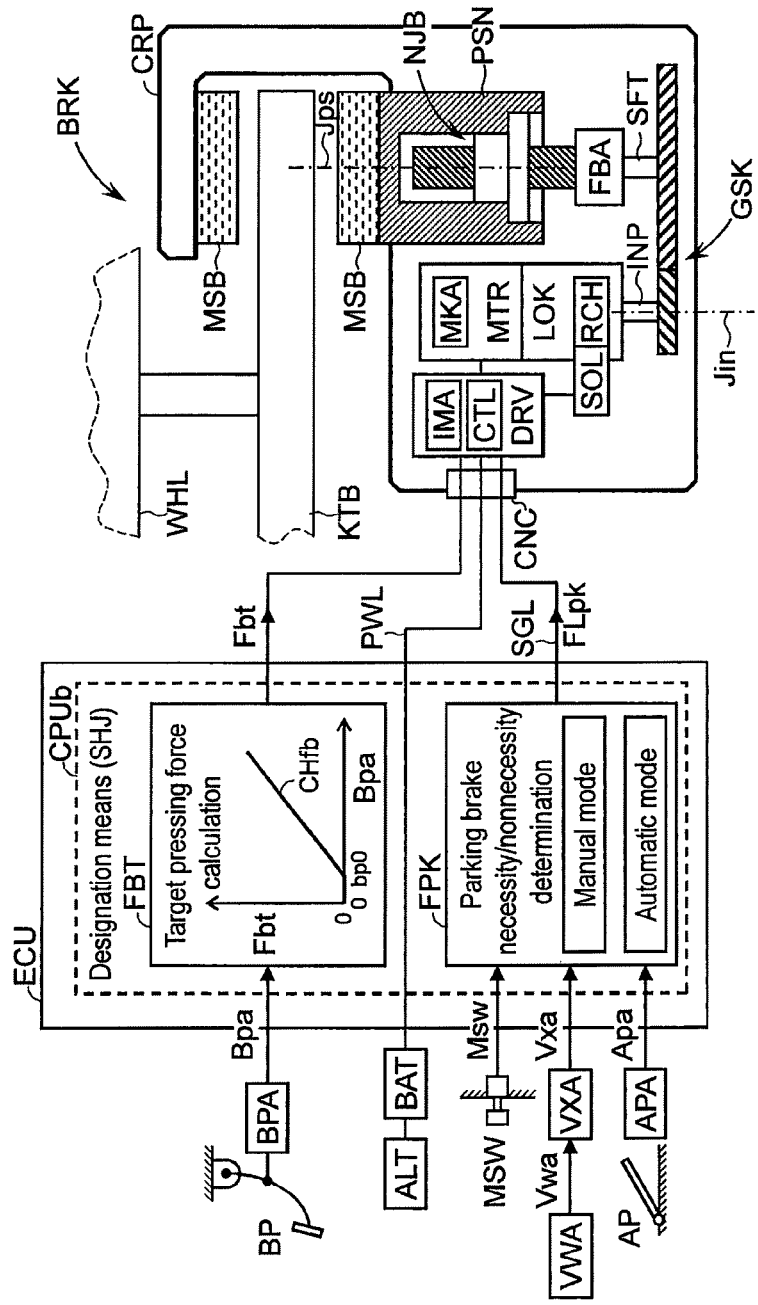

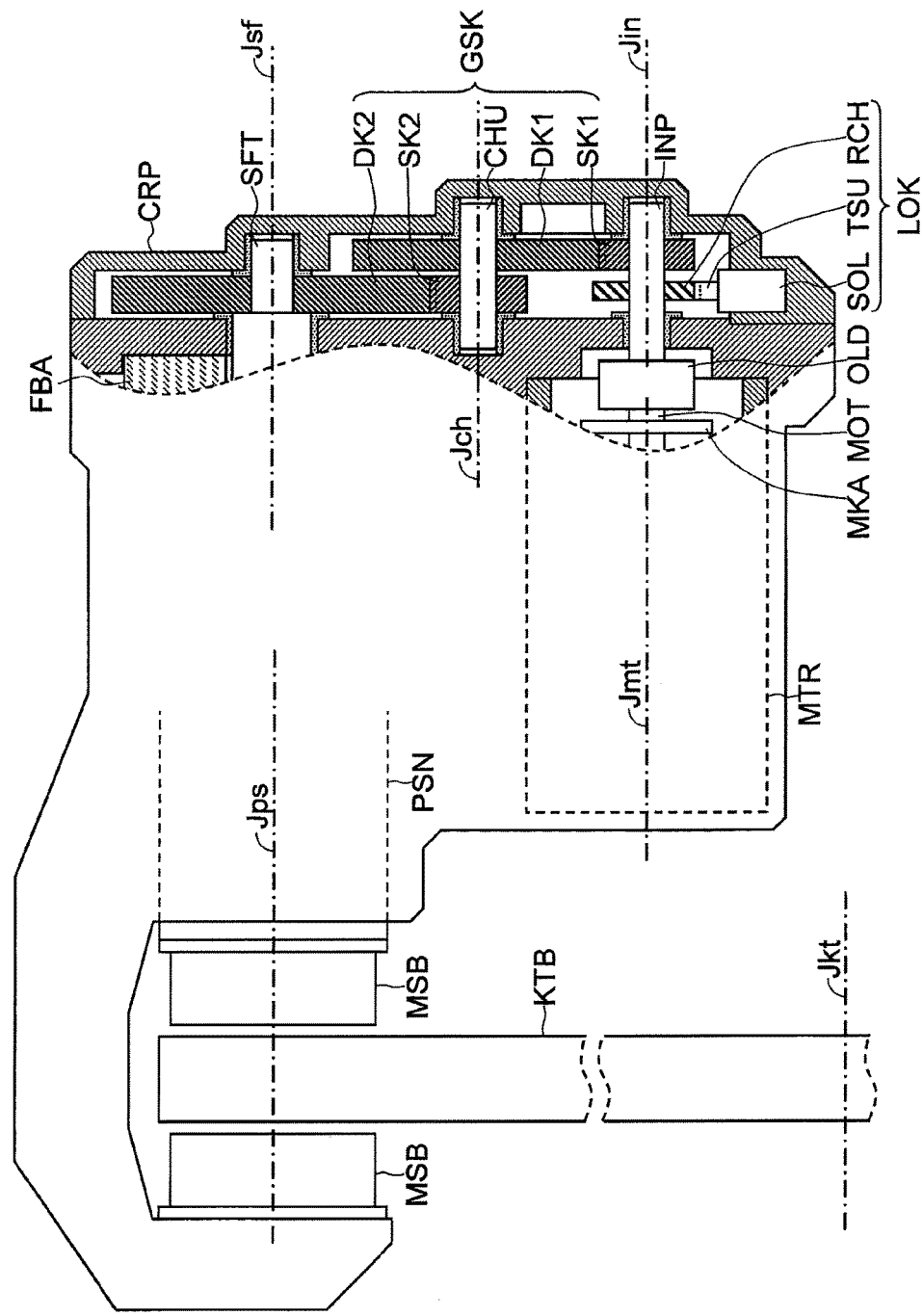
[FIG. 2]

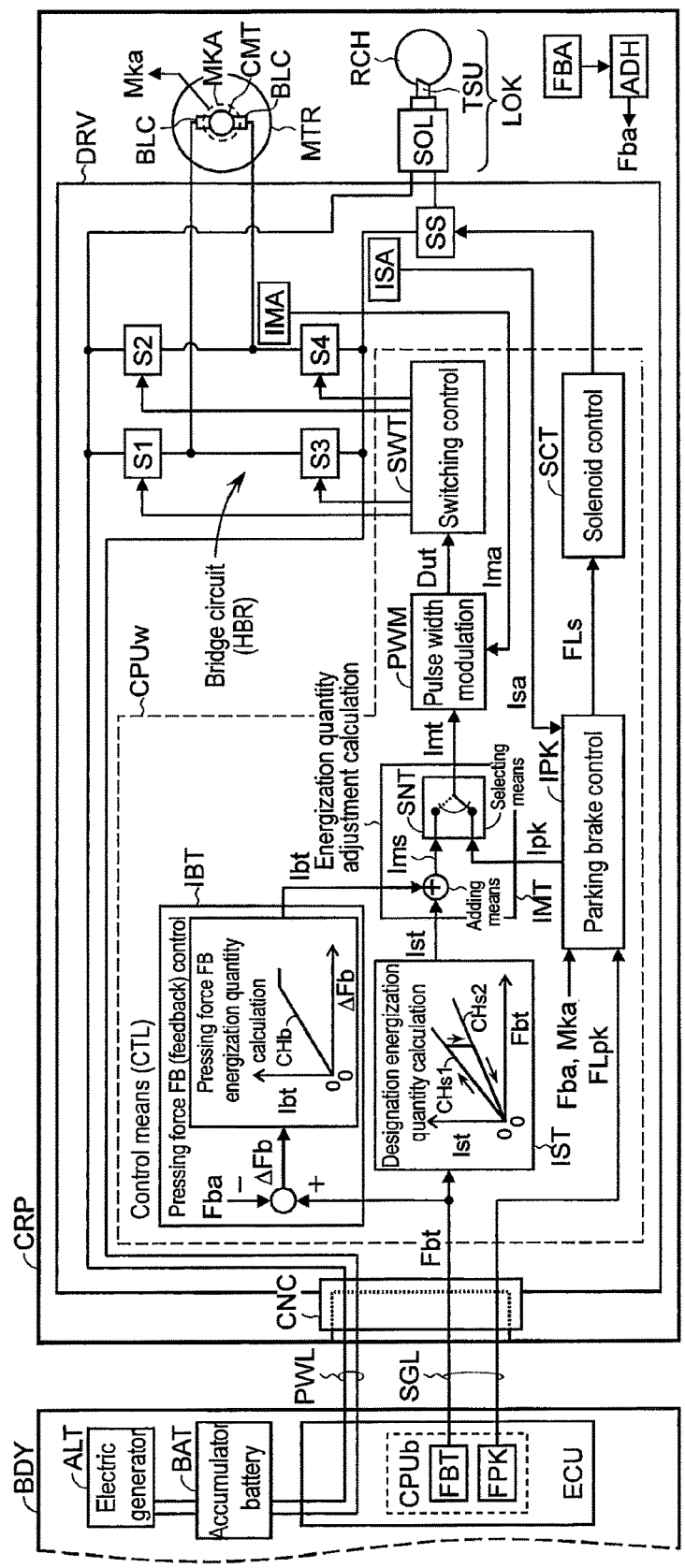
[FIG. 3]

State in which pawl member TSU and ratchet wheel RCH are interlocked with each other (state in which TSU is located at interlocking position Pkm)

State in which interlocking between pawl member TSU and ratchet wheel RCH is canceled (state in which TSU is pressed against release position Pkj)

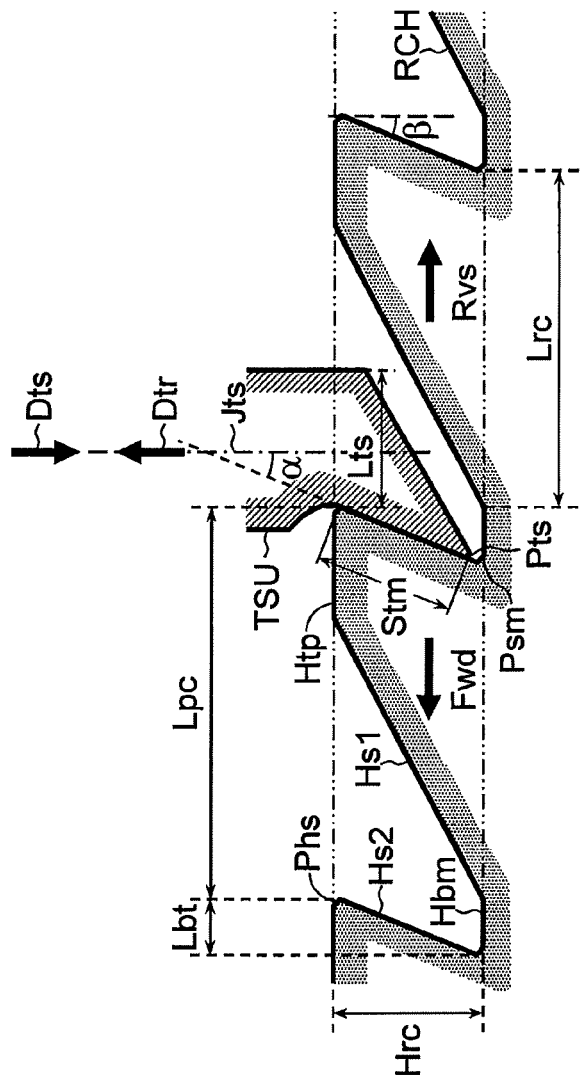
[FIG. 5]

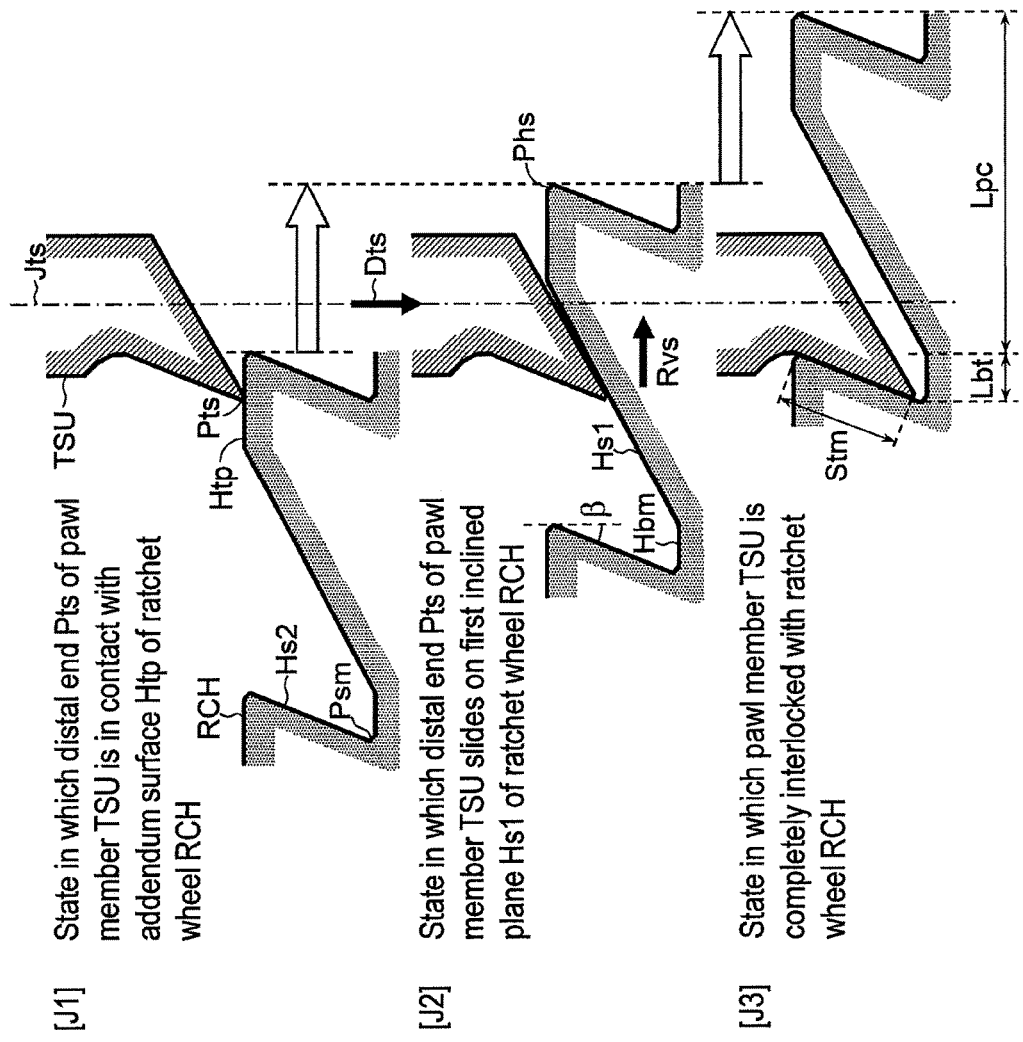
[FIG. 6]

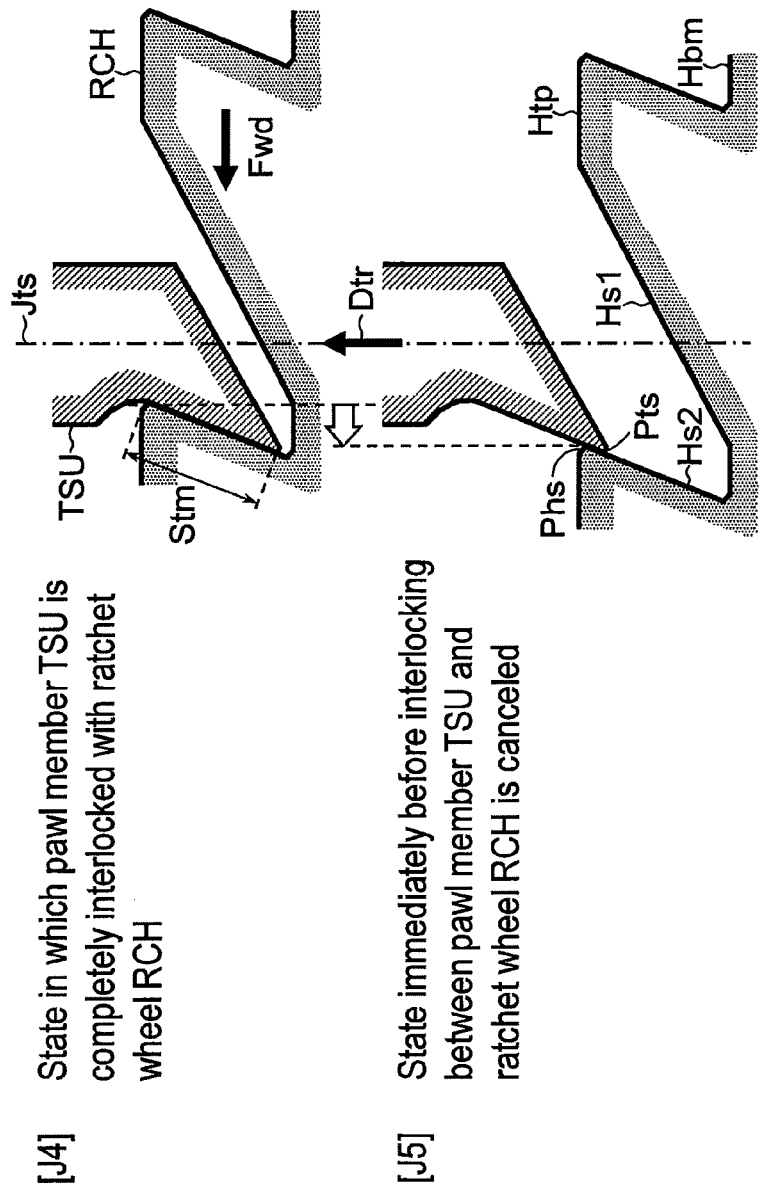

Positional relationship between rotating axis Jrc of ratchet wheel RCH and interlocked portion (contact portion) Stm of pawl member TSU Relationship between offset distance Los and inclination angle β of tooth of ratchet wheel RCH in interlocking between TSU and RCH

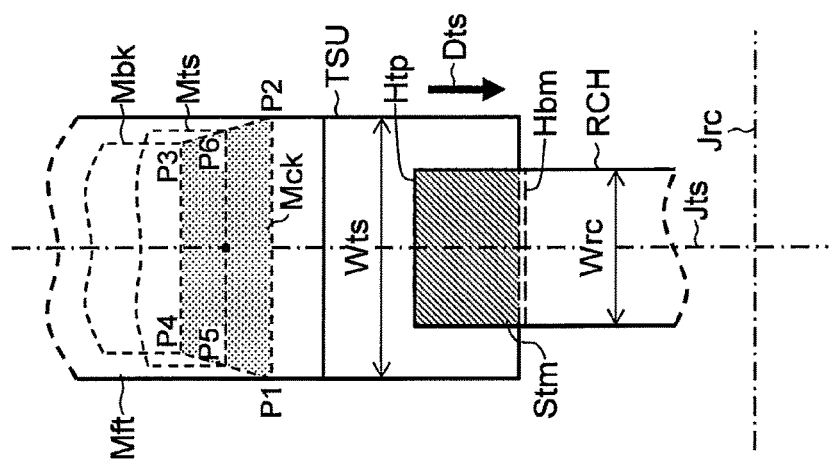
[FIG. 10]

Example of experiment result obtained by measuring wheel acceleration Gw (Gh, Gv) when accelerometer GS is disposed on wheel WHL Experiment result obtained by measuring magnitude and direction of wheel acceleration caused by road-surface unevenness when vehicle travels at various vehicle speeds on road having large road-surface unevenness

[FIG. 12]
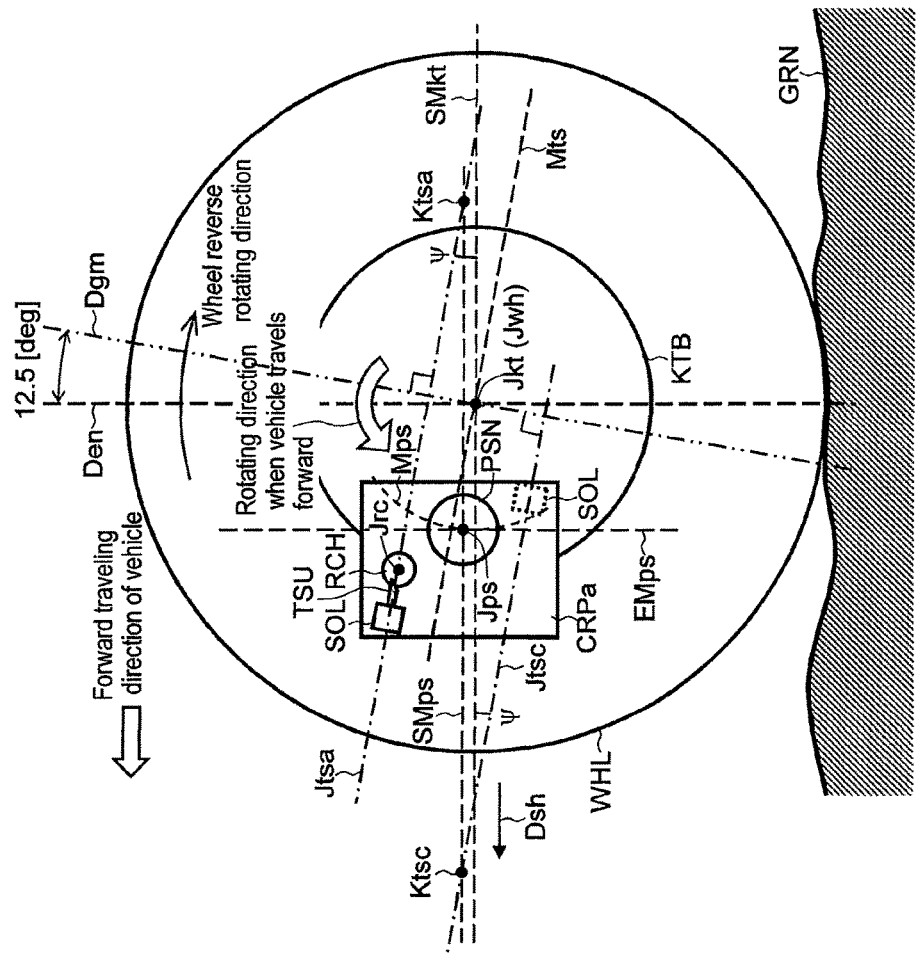

[FIG. 13]
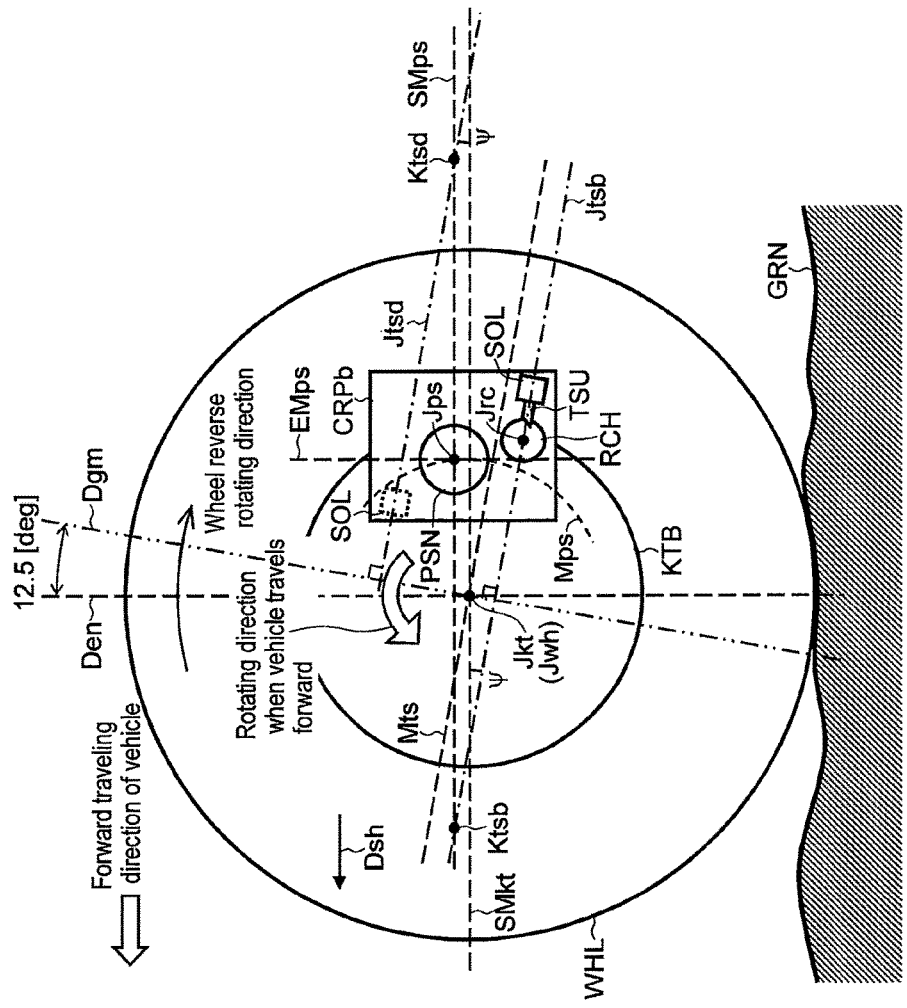

[FIG. 14]
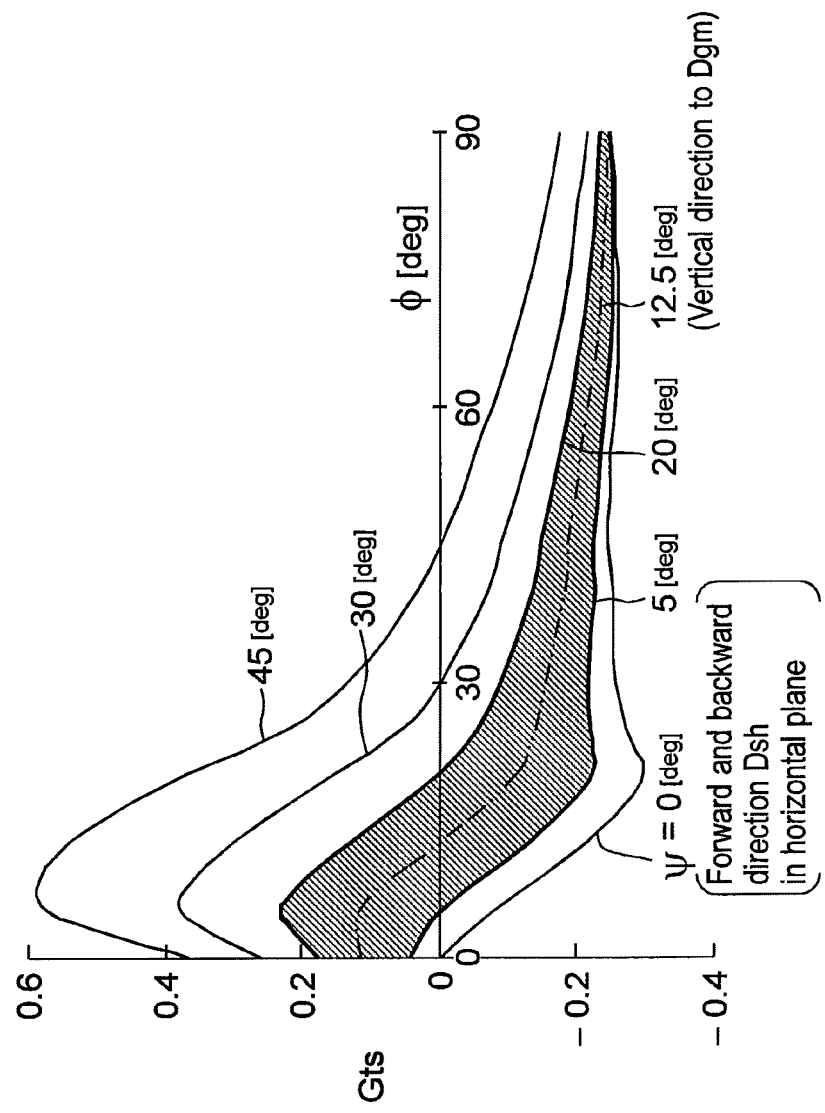

ELECTRIC BRAKING DEVICE FOR VEHICLE

TECHNICAL FIELD

The present invention relates to an electric braking device for vehicle.

BACKGROUND ART

In the description of Japanese Unexamined Patent Publication No. 2003-042199, "in order to exert the function of a parking brake without spoiling the function of an electric brake", "a pawl wheel is disposed on a peripheral surface of a rotor of a motor. An engagement pawl biased in one direction with a torsion spring is disposed on an oscillating arm disposed around the rotor. The oscillating arm is always biased toward the pawl wheel with a tension spring. In this description, braking force is generated with rotation in a braking direction of the rotor in the operation of the parking brake. Thereafter, electric conduction to the motor is cut off to cause engagement between the engagement pawl and the pawl wheel to regulate returning of the rotor". In the description, "when the parking brake is operated, the engagement pawl keeps a projecting attitude to be brought into contact with a projection with biasing force of the torsion spring. As a result, the engagement of the engagement pawl and the pawl wheel regulates counterclockwise rotation of the rotor to establish the parking brake (see FIG. 3 in Japanese Unexamined Patent Publication No. 2003-042199).

The parking brake mechanism described in Japanese Unexamined Patent Publication No. 2003-042199 uses an oscillating arm (Lever) to interlock the pawl member with a ratchet wheel. However, a structure (direct drive structure) in which a solenoid actuator (to also be simply referred to as a solenoid) directly drives the pawl member to miniaturize the device is strongly desired. The direct drive structure requires that "relative location accuracy between the ratchet wheel and the pawl member is secured", consequently, that "the ratchet wheel and the pawl member are reliably interlocked with each other when the solenoid is turned on"

SUMMARY OF THE INVENTION

The present invention has been made to cope with the above problems, and has as its object to provide an electric braking device for vehicle including a parking brake mechanism having a ratchet wheel and a pawl member which can secure relative location accuracy therebetween.

An electric braking device for vehicle according to the present invention includes an electric motor (MTR) disposed on a wheel (WHL) side of a vehicle; a caliper (CRP) disposed on the wheel (WHL) side; a pressing member (PSN) disposed on the caliper (CRP) and pressing a friction member (MSB) against a rotating member (KTB) rotating integrally with the wheel (WHL); a power transmission member (INP, SFT) rotatably supported on the caliper (CRP) and rotationally driven with the electric motor (MTR) to drive the pressing member (PSN); a ratchet wheel (RCH) fixed to the power transmission member (INP, SFT); a pawl member (TSU) which is disposed to be able to move in a first linear direction with reference to the caliper (CRP) and can be interlocked with the ratchet wheel (RCH); a guide member (GID) serving as a part of the caliper (CRP) or fixed to the caliper (CRP) and guiding movement of the pawl member (TSU) in the first linear direction; a solenoid (SOL) having a fixed member (BAS, COL) fixed to the caliper (CRP) and a movable member (PLN, PBR) disposed to be able to move in the first linear direction with reference to the fixed member (BAS, COL) and engaged with the pawl member (TSU) being independent of the movable member, the solenoid (SOL) causing the movable member (PLN, PBR) to press the pawl member (TSU) in an on state in an interlocking direction (Dts) in which the pawl member (TSU) in the first linear direction comes close to the ratchet wheel (RCH); and an elastic member (SPR) always pressing the pawl member (TSU) in a release direction (Dtr) opposing the interlocking direction (Dts) in the first linear direction.

According to the configuration, the power transmission members INP and SFT are rotatably supported with the caliper CRP, and the ratchet wheel RCH is fixed to the power transmission members INP and SFT. "The guide member GID serving as a part of the caliper CRP or fixed to the caliper CRP" guides movement of the pawl member TSU in the first linear direction. In other words, the guide member GID regulates movement of the pawl member TSU in a direction perpendicular to the first linear direction and an inclination of the pawl member TSU from the first linear direction. The ratchet wheel RCH and the pawl member TSU are disposed with reference to a common member, which is the caliper CRP. Furthermore, the elastic member SPR always presses the pawl member TSU in "a direction in which the pawl member TSU comes away from the ratchet wheel RCH" (=the release direction Dtr in which the pawl member TSU is pressed against the movable members PLN and PBR). When the solenoid SOL is turned on, force applied to the pawl member TSU with the solenoid SOL (interlocking force in the interlocking direction Dts) and force applied to the pawl member TSU with the elastic member SPR (release force in the release direction Dtr) oppose each other, and the interlocking force is larger than the release force. Thus, the pawl member TSU and the movable members PLN and PBR can be integrated with each other and linearly move in either the interlocking direction Dts or the release direction Dtr.

The configuration allows relative location accuracy between the ratchet wheel RCH and the pawl member TSU to be secured. In addition, the pawl member TSU is not fixed to the movable members PLN and PBR and separated from the movable members PLN and PBR as an independent member. For this reason, in assembling the electric braking device, the pawl member TSU and the solenoid SOL can be assembled in independent steps, respectively. As a result, the workability is improved.

The electric braking device according to the present invention includes a decelerator (GSK) interposed in a power transmission path between the plurality of power transmission members (INP and SFT) and decelerating rotation of the electric motor (MTR), and the ratchet wheel (RCH) is preferably fixed to the power transmission member (INP) of the plurality of power transmission members (INP and SFT) on a side close to the electric motor (MTR) with reference to the decelerator (GSK).

On an inlet side (side close to the electric motor MTR) of the decelerator GSK before the rotation of the electric motor MTR is decelerated, a holding torque (i.e., force applied when the pawl member TSU blocks rotation of the ratchet wheel RCH) applied when a parking brake function is exerted is relatively small. Based on the viewpoint, the configuration described above can miniaturize the ratchet wheel RCH.

The miniaturization of the ratchet wheel RCH requires further improvement of relative location accuracy (location accuracy to appropriately interlock the pawl member TSU and the ratchet wheel RCH with each other) between the pawl member TSU and the ratchet wheel RCH. With respect to this point, according to the configuration described above, the relative location accuracy between the pawl member TSU and the ratchet wheel RCH can be secured to make it possible to achieve miniaturization of a parking brake mechanism.

In the electric braking device according to the present invention, an engagement portion between the pawl member (TSU) and the movable member (PBR) includes concave and convex shapes which can be fitted to each other, a gap (Spb) in which the pawl member (TSU) and the movable member (PBR) are interlocked with each other is preferably larger than a gap (Sgd) between the pawl member (TSU) and the guide member (GID) (Spb>Sgd).

In the configuration, since the pawl member TSU is independent of the movable member PBR, the solenoid SOL can be mounted on the caliper CRP after the pawl member TSU is mounted on the caliper CRP. When this assembling procedure is employed, according to the configuration, the engagement portion between the pawl member TSU and the movable member PBR includes concave and convex shapes which can be fitted to each other. Thus, these components can be reliably assembled. Furthermore, the fitting gap Spb between the pawl member TSU and the movable member PBR is relatively widely set. For this reason, the assembling can be simplified.

In the electric braking device according to the present invention, on the guide member (GID), with respect to a guide surface guiding movement of the pawl member (TSU) in the first linear direction, a length (Lbk) of the guide surface in the first linear direction on a side (backward Mbk side) far from a pawl (Tme) formed on the pawl member (TSU) is preferably longer than a length (Lft) of the guide surface in the first linear direction on a side (forward Mft side) close to the pawl (Tme) of the pawl member (TSU).

When the ratchet wheel RCH and the pawl member TSU are ordinarily interlocked with each other, the ratchet wheel RCH applies force in a tangential direction of the ratchet wheel RCH to the pawl member TSU. The force in the tangential direction causes bending moment to act on the pawl member TSU. In this case, according to the configuration, the length Lbk of the guide surface of the guide member GID in the first linear direction on the backward Mbk of the pawl member TSU is set to be relatively long. For this reason, the pawl member TSU can be reliably supported for the bending moment and can be suppressed from being deformed. The length Lft of the guide surface of the guide member GID in the first linear direction on the forward Mft of the pawl member TSU is set to be relatively short. For this reason, interference between the guide member GID and the ratchet wheel RCH can be easily avoided.

BRIEF DESCRIPTION OF THE DRAWINGS

FIG. 1 is an overall block diagram of an electric braking device for vehicle according to an embodiment of the present invention.

FIG. 2 is a partially sectional view for explaining a parking brake mechanism (lock mechanism) LOK.

FIG. 3 is a functional block diagram for explaining a drive circuit DRV or the like.

FIG. 5 is a diagram for explaining names of components of the pawl member TSU and the ratchet wheel RCH.

FIG. 6 is a diagram for explaining relative movement between the pawl member TSU and the ratchet wheel RCH in an interlocking start operation.

FIG. 7 is a diagram for explaining relative movement between the pawl member TSU and the ratchet wheel RCH in an interlocking release operation.

FIG. 10 is a diagram for explaining an interlocking state between the pawl member TSU and the ratchet wheel RCH in detail.

FIG. 12 is a diagram for explaining appropriate disposal of a central axis Jts (Jtsa, Jtsc) of the pawl member TSU when a braking means BRK is disposed on the front side of a wheel WHL (forward disposal).

FIG. 13 is a diagram for explaining appropriate layout of the central axis Jts (Jtsb, Jtsd) of the pawl member TSU when the braking means BRK is disposed on the rear side of the wheel WHL (backward layout).

FIG. 14 is a diagram for explaining an acceleration component Gts acting in a moving direction of the pawl member TSU when the central axis Jts of the pawl member TSU is disposed in an appropriate range.

DESCRIPTION OF EMBODIMENTS

Figure 4B:
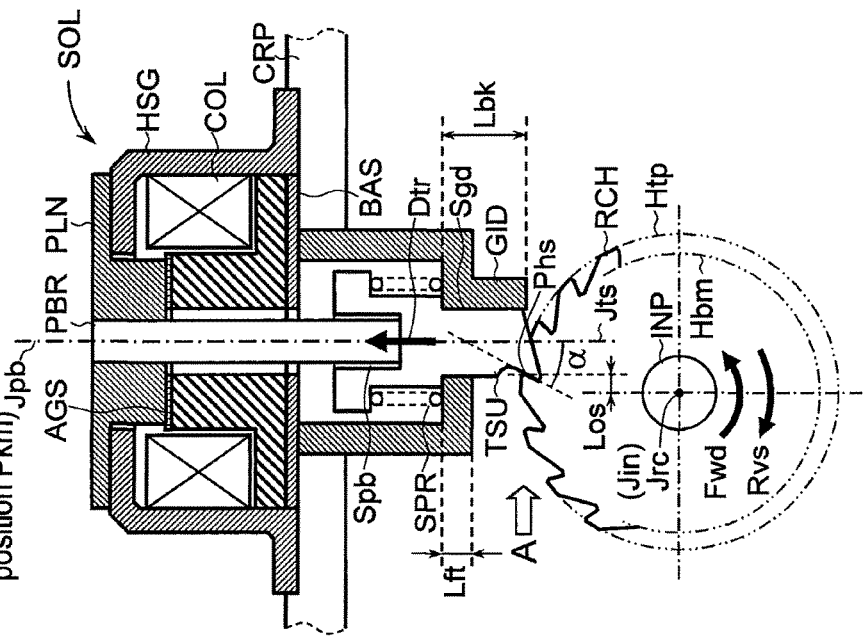
FIGS. 4A and 4B are diagrams for explaining an interlocking state between a pawl member TSU and a ratchet wheel RCH.

An electric braking device for vehicle according to an embodiment of the present invention will be described below with respect to the accompanying drawings.

<Overall Configuration of Electric Braking Device for Vehicle According to Embodiment of the Present Invention>

FIG. 1 is an overall block diagram of the electric braking device.

A vehicle having the electric braking device includes a braking operation member BP, an operation quantity acquiring means BPA, an acceleration operation member AP, an acceleration operation quantity acquiring means APA, a parking brake switch MSW, a wheel speed acquiring means VWA, a vehicle speed acquiring means VXA, an electronic control unit ECU, an electric power sources BAT and ALT, a braking means (brake actuator) BRK, a rotating member KTB, and a friction member MSB.

<<Braking Operation Member BP, Braking Operation Quantity Acquiring Means BPA, and Braking Operation Quantity Bpa>>

A braking operation member (for example, a brake pedal) BP is a member operated to decelerate a vehicle with a driver. Depending on an operation of the braking operation member BP, the braking means BRK adjusts a braking torque of the wheel WHL. As a result, braking force is generated on the wheel WHL to decelerate the driving vehicle.

The braking operation quantity acquiring means BPA is disposed on the braking operation member BP. The braking operation quantity acquiring means BPA acquires (detects) an operation quantity (braking operation quantity) Bpa of the braking operation member BP operated with a driver.

As the braking operation quantity acquiring means BPA, at least one of a sensor (pressure sensor) detecting a pressure of a master cylinder, a sensor (force-on-brake-pedal sensor) detecting operation force of the braking operation member BP, and a sensor (brake pedal stroke sensor) detecting a displacement of the BP is employed. Thus, the braking operation quantity Bpa is calculated based on at least one of a master cylinder pressure, force on brake pedal, and a brake pedal stroke. The detected braking operation quantity Bpa is input to the electronic control unit ECU (more specifically, a central processing unit CPU disposed in the ECU).

<<Acceleration Operation Member AP, Acceleration Operation Quantity Acquiring Means APA, and Acceleration Operation Quantity Apa>>

The acceleration operation member (for example, an acceleration pedal) AP is a member operated to accelerate a vehicle with a driver. The acceleration operation quantity acquiring means APA is disposed in the acceleration operation member AP. The acceleration operation quantity acquiring means APA acquires (detects) the acceleration quantity (acceleration operation quantity) Apa of the acceleration operation member AP with a driver. As the acceleration operation quantity acquiring means APA, a sensor (throttle opening sensor) detecting a throttle opening of an engine and a sensor (force-on-acceleration-pedal sensor and acceleration pedal stroke sensor) detecting an operation force and or a displacement of the acceleration operation member AP. Thus, the acceleration operation quantity Apa is calculated based on at least one of the throttle opening, the force on acceleration pedal, and the acceleration pedal stroke.

<<Parking Brake Switch MSW and Designation Signal Msw>>

The parking brake switch (to also be simply referred to as a switch) MSW is a manual switch operated with a driver to output a signal Msw turning on/off (ON/OFF) the switch MSW. The driver operates the switch MSW to designate a parking brake maintaining the stop state of the vehicle to be operated or released. More specifically, the signal Msw is a designation signal for the parking brake. For example, the parking brake is designated to be operated when the designation signal Msw is turned on, and designated to be released when the designation signal Msw is turned off.

<<Vehicle Speed Acquiring Means VXA, Vehicle Speed Vxa, Wheel Speed Acquiring Means VWA, and Wheel Speed Vwa>>

The vehicle speed acquiring means VXA acquires (detects) a vehicle speed Vxa. The vehicle speed Vxa is calculated based on the detection signal (wheel speed) Vwa of the wheel speed acquiring means VWA and a known method. For example, the maximum value of the rotating speeds Vwa of the wheels can be calculated as the vehicle speed Vxa.

The braking operation quantity Bpa, the acceleration operation quantity Apa, the vehicle speed Vxa, and the designation signal Msw are input to the electronic control unit ECU. The Bpa, the Apa, the Vxa, and the Msw are calculated or acquired with the electronic control unit, and the calculation values (signals) are transmitted to the ECU through a communication bus.

<<Electronic Control Unit ECU>>

The electronic control unit ECU includes an electric circuit (printed board) including a processor CPUb, and is fixed to a vehicle body BDY. The "processor" mentioned here is an electronic circuit executing calculation processing and a "CPU (Central Processing Unit)", and the "printed board" is a board-like component having electronic components such as an integrated circuit, a resistor, and a capacitor fixed on the surface thereof, the electronic components being connected to each other with wires to configure an electronic circuit.

In the processor CPUb of the electronic control unit ECU, a target pressing force calculation block FBT and a parking brake necessity/unnecessity determination block FPK are programmed. The target pressing force calculation block FBT calculates a target pressing force Fbt based on the Bpa. The parking brake necessity/unnecessity determination block FPK determines whether the parking brake is necessary or unnecessary based on the Msw and the like. More specifically, a signal FLpk to designate the parking brake to be operated or released is determined. The signal FLpk mentioned here is a control flag, "FLpk=0" represents an unnecessity state of the parking brake, and "FLpk=1" represents a necessity state of the parking brake. The designation signal FLpk is transmitted to the drive circuit DRV through a signal line SGL. Electric power to drive the electric motor MTR is supplied from the BAT or the like to the drive circuit DRV through the electronic control unit ECU.

<<Target Pressing Force Calculation Block FBT and Target Pressing Force Fba>>

The details of the target pressing force calculation block FBT will be described below. The FBT is a control algorithm which is programmed in the processor CPUb in the ECU. The FBT is a control algorithm to calculate a target value Fbt in a so-called normal brake function.

The target pressing force calculation block FBT calculates the target pressing force (target signal) Fbt related to force (pressing force) applied when the friction member (brake pad) MSB presses a rotating member (brake disk) KTB. More specifically, the Fbt is calculated based on the braking operation quantity Bpa and a calculation map CHfb set in advance. The Fbt is transmitted to the drive circuit DRV fixed on the wheel WHL side through the signal line SGL.

<<Parking Brake Necessity/Unnecessity Determination Block FPK and Designation Signal FLpk>>

The details of the parking brake necessity/unnecessity determination block FPK will be described below. The parking brake necessity/unnecessity determination block FPK determines whether the parking brake to maintain a stop state of the vehicle is necessary or not. More specifically, the FPK determines whether the parking brake is operated or released to calculate a determination result FLpk. The signal FLpk is a control flag representing whether the parking brake is necessary or unnecessary. For example, the FLpk is expressed by "0 (unnecessity determination result)" or "1 (necessity determination result)".

The parking brake necessity/unnecessity determination block FPK has a manual mode based on a switch operation by a driver and an automatic mode based on a vehicle speed or the like.

The parking brake necessity/unnecessity determination block FPK receives the switch signal Msw, the vehicle speed Vxa, and the acceleration operation quantity Apa. The FPK outputs a control flag FLpk for parking brake. More specifically, when the "parking brake is unnecessary (unnecessary determination)" is determined, FLpk=0 is output as a designation signal. More specifically, when the "parking brake is necessary (necessary determination)" is determined, FLpk=1 is output as a designation signal. The control flag (designation signal) FLpk is transmitted to the drive circuit DRV through the communication line SGL.

The manual mode of the parking brake necessity/unnecessity determination block FPK determines whether the parking brake is necessary or unnecessary based on the operation signal Msw of the manual switch MSW for parking brake operated by a driver. For example, the switch MSW is turned off to select an "unnecessity state (FLpk=0) of the parking brake", and the switch MSW is turned on to select a "necessity state (FLpk=1) of the parking brake".

The automatic mode of the parking brake necessity/unnecessity determination block FPK automatically determines whether the parking brake is necessary or unnecessary (operated or released) in conjunction with an operation of the acceleration operation member (acceleration pedal) AP regardless of the operation of the switch MSW by the driver. More specifically, in the automatic mode, it is determined based on the vehicle speed Vxa and the acceleration operation quantity Apa whether the parking brake is necessary or unnecessary.

For example, during traveling of the vehicle (Vxa>0), the unnecessity state (FLpk=0) of the parking brake is determined. When the vehicle stops (i.e., Vxa becomes zero), the necessity state of the parking brake is determined, and the control flag FLpk is switched from "0" to "1". The driver operates the acceleration operation member AP, the unnecessity state of the parking brake is determined when the acceleration operation quantity Apa exceeds a predetermined value ap1, and the control flag FLpk is switched from "1" to "0".

<<Accumulator Battery BAT and Electric Generator ALT>>

An accumulator battery (battery) BAT and an electric generator (alternator) ALT supply an electric power to the electronic control unit ECU, the drive circuit DRV, and the electric motor MTR. The accumulator battery BAT and the electric generator ALT are collectively called power sources.

The electric power sources BAT and ALT are fixed on the vehicle body BDY side. When an accumulation amount of the accumulator battery BAT decreases, the alternator ALT charges the BAT. Electric power (current) from the electric power sources BAT and ALT is supplied to the drive circuit DRV (finally, the electric motor MTR) through a power line PWL.

<<Braking Means BRK, Friction Member MSB, and Rotating Member KTB>>

The braking means (brake actuator) BRK is disposed on the wheel WHL to give the wheel WHL braking torque and to generate braking force. The vehicle is decelerated with the BRK while traveling (the BRK functioning as a normal brake). During stoppage of the vehicle, the BRK functions as a parking brake maintaining the stop state of the vehicle.

Although the configuration of a so-called disk braking device (disk brake) is illustrated as the electric braking device BRK, in this case, the friction member MSB is a brake pad, and the rotating member KTB is a brake disk. The braking means BRK may be a drum braking device (drum brake). In the drum brake, the friction member MSB is a brake shoe, and the rotating member KTB is a brake drum.

The details of the braking means BRK will be described below. The braking means BRK includes a brake caliper CRP, a pressing member PSN, the electric motor MTR, a position acquiring means MKA, a decelerator GSK, a shaft member SFT, a screw member NJB, a pressing force acquiring means FBA, a drive circuit DRV, a connector CNC, and a lock mechanism LOK for parking brake.

(Brake Caliper CRP and Pressing Member PSN)

As the brake caliper (to also be referred to as a caliper) CRP, a floating caliper can be employed. The caliper CRP is configured such that the rotating member (brake disk) KTB is sandwiched by two friction members (brake pads).

The caliper CRP is partially configured by a box-shaped structure. More specifically, the caliper CRP has a space formed therein, and various members (drive circuit DRV and the like) are housed in the space. The box-shaped part of the caliper CRP is called a case member CAS. More specifically, the case member CAS is a part of the caliper CRP having a cavity formed therein. On the relationship between the caliper CRP and the CAS, a structure in which both the caliper CRP and the CAS are integrally formed or a structure in which the caliper CRP and the CAS independently formed are combined to each other can be employed.

In the caliper CRP, a pressing member (brake piston) PSN is moved (forward or backward) with reference to the rotating member KTB. The movement of the pressing member PSN causes the friction member MSB to be pressed against the rotating member KTB to generate friction force. For example, the PSN has a cylindrical shape and a central axis Jps. Thus, the PSN is moved in a direction along the axis Jps.

The pressing member PSN is moved with the power of the electric motor MTR. More specifically, an output (rotating power of a motor shaft) of the electric motor MTR is transmitted to the shaft member SFT through the decelerator GSK. The rotating power (torque of the shaft axis) of the shaft member SFT is converted into linear power (thrust power in the axial direction of the pressing member) with a power conversion member NJB to transmit the linear power to the pressing member PSN. As a result, the pressing member PSN is moved (forward or backward) with reference to the rotating member KTB. In this case, the central axis Jps is identical to the rotational axis of the SFT.

The movement of the pressing member PSN allows force (pressing force) applied when the friction member MSB presses the rotating member KTB to be adjusted. Since the rotating member KTB is fixed to the wheel WHL, friction force is generated between the friction member MSB and the rotating member KTB to adjust braking force of the wheel WHL.

(Electric Motor MTR)

The electric motor MTR is a power source to drive (move) the pressing member PSN. For example, as the electric motor MTR, a motor with brush or a brushless motor can be employed. In the rotating direction of the electric motor MTR, a forward rotating direction corresponds to a direction in which the friction member MSB comes close to the rotating member KTB (direction in which the pressing force increases to increase braking torque), and a reverse rotating direction corresponds to a direction in which the friction member MSB comes away from the rotating member KTB (direction in which the pressing force decreases to decrease braking torque). Electric power to the electric motor MTR is supplied through the power line PWL and the connector CNC.

(Position Acquiring Means MKA and Actual Position Mka)

The position acquiring means (for example, rotating angle sensor) MKA acquires (detects) the position (for example, rotating angle) Mka of a rotor of the electric motor MTR. For example, the position acquiring means MKA is disposed in the electric motor MTR coaxially with the rotor and a commutator. More specifically, the MKA is disposed on a rotating axis Jmt of the electric motor MTR. The detected position (rotating angle) Mka is input to the drive circuit DRV (more specifically, a processor CPUw in the drive circuit DRV).

(Decelerator GSK, Shaft Member SFT, and Screw Member NJB)

The decelerator GSK, the shaft member SFT, and the screw member NJB constitute a power transmission mechanism to transmit power of the electric motor MTR to the pressing member PSN. The decelerator GSK acts on the power of the electric motor MTR to reduce the rotating speed and outputs the reduced rotating speed to the shaft member SFT. A rotating output (torque) of the electric motor MTR is increased depending on a reduction ratio of the decelerator GSK to obtain rotating force (torque) of the shaft member SFT. For example, the GSK is configured by a gear transmission mechanism. A wound transmission mechanism such as a belt and a chain or a friction transmission mechanism can be employed.

The shaft member SFT is a rotating shaft member which transmits rotating power transmitted from the decelerator GSK to the screw member NJB. The screw member NJB is a power conversion mechanism (rotating-linear power conversion member) which converts rotating power of the shaft member SFT into linear power. For example, as the NJB, a slip screw (trapezoidal screw or the like) or a rolling screw (ball screw or the like) can be employed.

(Pressing Force Acquiring Means FBA and Actual Pressing Force Fba)

The pressing force acquiring means (for example, pressing force sensor) FBA acquires (detects) force (pressing force) Fba applied when the pressing member PSN presses the friction member MSB. The detected actual pressing force Fba is input to the drive circuit DRV (more specifically, the CPUw in the DRV). For example, the pressing force acquiring means FBA is disposed between the shaft member SFT and the caliper CRP. More specifically, the FBA is disposed on the rotating axis of the shaft member SFT and fixed to the caliper CRP.

(Drive Circuit DRV)

The drive circuit (electric circuit) DRV is an electric circuit (printed board) which drives the electric motor MTR and a solenoid actuator (to also be simply referred to as a solenoid) SOL. The drive circuit DRV is disposed (fixed) in the case member CAS. On the drive circuit DRV, the processor (arithmetic processing unit) CPUw, a bridge circuit HBR, and the like are disposed. A control means CTL (control algorithm) is programmed in the CPUw.

The drive circuit DRV drives the electric motor MTR based on the target pressing force Fbt and controls an output from the electric motor MTR to exert a normal brake function. The drive circuit DRV controls the electric motor MTR and the solenoid SOL based on the designation signal (control flag) FLpk to exert a parking brake function. The Fbt and the FLpk are transmitted from the CPUb in the ECU to the CPUw in the drive circuit DRV through the signal line SGL and the connector CNC.

(Connector CNC)

The connector (Connector) CNC is made by fixing a metal terminal with an insulator such as a resin to connect components to each other or a wire (cable) and a component to each other to exchange electric power and/or a signal with the components and the wires. More specifically, the connector CNC is disposed on the CAS (part of the caliper CRP) on the wheel WHL side to relay at least one of the power line PWL and the signal line SGL. The connector CNC can be fixed on the drive circuit DRV. The connector CNC is commonly used by power supply (when relaying the PWL) and transmission (when relaying the SGL). However, connectors can be independently disposed for power supply and transmission, respectively.

(Parking Brake Mechanism (Lock Mechanism) LOK)

Since the parking brake mechanism (also called a lock mechanism) LOK is a brake function (so-called parking brake) maintaining a stop state of a vehicle, the electric motor MTR is locked not to rotate in the reverse rotating direction. As a result, movement of the pressing member PSN in a direction away from the rotating member KTB is restricted to maintain a pressing state of the rotating member KTB with the friction member MSB. In this case, the lock mechanism LOK can be disposed between the electric motor MTR and the decelerator GSK (more specifically, coaxially with the electric motor MTR).

The lock mechanism LOK includes a ratchet wheel (also called a pawl gear) RCH, a pawl member (also called a hanging pawl) TSU, and a solenoid actuator (to be simply referred to as a solenoid) SOL. The ratchet wheel RCH is fixed to an input member INP coaxially with the INP. The ratchet wheel RCH has directional teeth unlike an ordinary gear (for example, a spur gear). The solenoid SOL presses the pawl member TSU toward the ratchet wheel RCH to move the pawl member TSU toward the ratchet wheel RCH. The pawl member TSU is interlocked with the ratchet wheel RCH to restrict the movement of the pressing member PSN to function as a parking brake. In this case, the pawl member TSU and the solenoid SOL are independent members which are separated from each other.

<Layout of Lock Mechanism LOK for Parking Brake>

FIG. 2 is a partially sectional view for explaining an axial configuration of the braking means BRK and an arrangement of a parking brake mechanism (lock mechanism) LOK.

The braking means BRK employs a so-called multi-axial configuration having at least two different rotating axes (Jin, Jsf, and the like). More specifically, input portions (axes of the electric motor MTR, the INP, and the like) and output portions (axes of the PSN, the NJB, the SFT, and the like) of the BRK are arranged in a row. In this case, the input axis Jin and the output axis Jsf of the decelerator GSK are parallel with each other.

Relationships among the input member INP, the decelerator GSK, and the shaft member SFT when the multi-axial configuration is employed is described. The rotating speed of power of the input member INP is reduced with the decelerator GSK and output to the shaft member SFT. At this time, as output power from the shaft member SFT, rotating force (torque) being proportional to the reduction ratio of the GSK can be obtained.

For example, the decelerator GSK can employ a two-speed decelerator. More specifically, first deceleration is performed by a combination of a first small-diameter gear SK1 and a first large-diameter gear DK1, and second deceleration is performed by a combination of a second small-diameter gear SK2 and a second large-diameter gear DK2.

The first small-diameter gear SK1 is fixed to the input member INP and rotated around the rotating axis Jin integrally with the INP. The first large-diameter gear DK1 is fixed to an intermediate shaft member CHU and rotated around the rotational axis Jch integrally with the CHU. A bearing of the SK1 (INP) and a bearing of the DK1 (CHU) are fixed to the caliper CRP. The SK1 and DK1 are meshed with each other through their teeth. A pitch circle diameter of the first large-diameter gear DK1 is larger than a pitch circle diameter of the first small-diameter gear SK1, the number of teeth of the first large-diameter gear DK1 is larger than the number of teeth of the first small-diameter gear SK1. More specifically, the power of the first small-diameter gear SK1 is reduced and output from the first large-diameter gear DK1.

The second small-diameter gear SK2 is fixed to the intermediate shaft member CHU and rotated around the rotational axis Jch integrally with the CHU. The second large-diameter gear DK2 is fixed to the shaft member SFT and rotated around the rotational axis Jsf integrally with the SFT. A bearing of the SK2 (CHU) and a bearing of the DK2 (SFT) are fixed to the caliper CRP. The SK2 and DK2 are meshed with each other through their teeth. A pitch circle diameter of the second large-diameter gear DK2 is larger than a pitch circle diameter of the second small-diameter gear SK2, the number of teeth of the second large-diameter gear DK2 is larger than the number of teeth of the second small-diameter gear SK2. More specifically, the power of the second small-diameter gear SK2 is reduced and output from the second large-diameter gear DK2.

The configuration described above allows the rotating power transmitted from the input member INP to be input from the first small-diameter gear SK1 to the decelerator GSK, reduced at two speeds, and output from the second large-diameter gear DK2 to the shaft member SFT. As the decelerator GSK, a one-speed decelerator can be used. In this case, power from the input member INP is input to the first small-diameter gear SK1, reduced by the SK1 and the DK1, and output from the shaft member SFT. The multi-axial configuration allows the BRK to be shortened in the axial direction (Jps direction of the PSN) and makes it possible to increase the degree of freedom of the layout. The reduction ratio of the decelerator GSK can be set to be relatively large, and an axis-to-axis distance between the Jin and the Jsf can be shortened.

An Oldham's coupling OLD can be disposed between the electric motor MTR and the input member INP. More specifically, an output unit MOT of the electric motor MTR is connected to the input member INP through the Oldham's coupling OLD. The Oldham's coupling OLD is a coupling which transmits power by slipping fitting between a projection (key) of a disk and a groove (key groove) of a slider. The Oldham's coupling OLD absorbs eccentricity between the rotational axis (also called a motor axis) of the electric motor MTR and the rotational axis (also called an input axis) Jin of the input member INP to transmit the rotating power (rotating motion) of the electric motor MTR to the INP.

The ratchet wheel RCH of the lock mechanism LOK is fixed to the input member INP. More specifically, the ratchet wheel RCH is disposed on the Oldham's coupling OLD on the opposite side of the electric motor MTR. Transmission torque of the input member INP is not increased with the decelerator GSK and is equal to the output torque of the electric motor MTR. The ratchet wheel RCH is fixed to the input member INP to make it possible to relatively reduce force acting on the ratchet wheel RCH and to achieve miniaturization of the lock mechanism LOK (for example, miniaturization of the ratchet wheel RCH, reduction in tooth width of the RCH, and reduction in output of the solenoid SOL). When Oldham's coupling OLD is repeatedly loaded with torque, a fitted portion (key and key groove) is worn to possibly cause backlash (gap between contact surfaces of machine elements in a rotational motion direction) to increase. The ratchet wheel RCH is disposed on the input member INP (the RCH is fixed to the OLD on the opposite side of the MTR) to make it possible to avoid pressing force from being reduced with abrasion or the like of the OLD (loosening of the parking brake).

<Drive Circuit DRV>

FIG. 3 is a functional block diagram for explaining the details of the drive circuit DRV and a control means CTL programmed in the DRV. FIG. 3 shows an example of the drive circuit DRV employing a motor with brush (to also be simply referred to as a brush motor) as the electric motor MTR.

<<Power Line PWL and Signal Line SGL>>

The power line PWL is an electric path to supply electric power from the electric power sources BAT and ALT to the electric motor MTR and the solenoid SOL. The connector CNC disposed in the case member CAS relays the power line PWL. As the power line PWL, a twisted pair cable (Twisted Pair Cable) formed by twisting two electric wires can be employed.

The signal line SGL is a signal transmission path transmitting (sending) signals Fbt and FLpk to control the electric motor MTR and the solenoid SOL from the ECU (CPUb) to the drive circuit DRV (CPUw). As the signal line SGL, a serial communication bus can be employed. The serial communication bus is a communication method in which data is serially transmitted one by one in one communication path. For example, as the serial communication bus, a CAN (Controller Area Network) bus can be employed.

The power line PWL and the signal line SGL are relayed with the connector CNC. In this case, the connector CNC is disposed on a surface of the case member CAS serving as a part of the caliper CRP. The power line PWL and the signal line SGL are collectively called wires (harnesses).

<<Drive Circuit DRV>>

The drive circuit DRV is an electric circuit (printed board) to drive the electric motor MTR and the solenoid SOL. More specifically, the drive circuit DRV adjusts an energization state to the electric motor MTR based on the target pressing force Fbt to exert a normal brake function. The drive circuit DRV adjusts energization states to the electric motor MTR and the solenoid SOL based on the designation signal FLpk to exert a parking brake function. The drive circuit DRV includes the bridge circuit HBR, an HBR energization quantity acquiring means (first energization quantity acquiring means) IMA, a switching element SS, a solenoid SOL energization quantity acquiring means (second energization quantity acquiring means) ISA, and the control means CTL. The drive circuit DRV is housed in the case member CAS serving as a part of the caliper CRP and fixed therein.

(Bridge Circuit HBR)

The bridge circuit is a circuit in which an energization direction to the electric motor can be changed in a single power source without requiring a bidirectional power source to make it possible to control a rotating direction (forward rotating direction or reverse rotating direction) of the electric motor. The bridge circuit HBR includes switching elements S1 to S4. The switching elements S1 to S4 are elements which can partially turn on (power on)/off (power off) the electric circuit. The switching elements S1 to S4 are driven with the control means CTL (signal from a switching control block SWT). The rotating directions and output torque of the electric motor MTR are adjusted by switching the power-on/off states of the switching elements. For example, as the switching elements, a MOS-FET and an IGBT are used.

When the electric motor MTR is driven in the forward rotating direction, the S1 and S4 are turned on (on state), and the S2 and S3 are turned off (off state). More specifically, in the forward rotational drive of the electric motor MTR in which the braking torque increases, a current flows through a path given by "S1→electric motor MTR (BLC/CMT)→S4" in the order named. In contrast to this, when the electric motor MTR is driven in the reverse rotating direction, the S1 and S4 are turned off (off state), and the S2 and S3 are turned on (on state). More specifically, in the reverse rotational drive of the electric motor MTR in which the braking torque decreases, a current flows through a path given by "S2→electric motor MTR (BLC/CMT)→S3" in the order opposing the order in the forward rotational drive.

When a brushless motor is employed in place of the motor with brush, the bridge circuit HBR includes 6 switching elements. As in the motor with brush, the energization state/non-energization state of the switching element is controlled based on a duty ratio Dut. In the brushless motor, the position acquiring means MKA acquires a rotor position (rotating angle) Mka of the electric motor MTR. Six switching elements constituting a 3-phase bridge circuit are controlled based on the actual position Mka. The switching elements sequentially switch the directions (i.e., excitation directions) of U-phase, V-phase, and W-phase coil energization quantities in the bridge circuit to drive the electric motor MTR. The rotating direction (forward or reverse rotating direction) of the brushless motor is determined by a relationship between the rotor and excitation positions.

(First Energization Quantity Acquiring Means (for Electric Motor MTR) IMA)

The energization quantity acquiring means (for example, a current sensor) for electric motor IMA is disposed on the bridge circuit HBR. The energization quantity acquiring means IMA acquires an energization quantity (actual measurement value) Ima of the electric motor MTR. For example, the motor current sensor IMA can detect, as the Ima, a value of current actually flowing in the electric motor MTR.

(Switching Element SS)

A switching element SS controls an energization state to the solenoid SOL. More specifically, the switching element SS is an element which can partially turn on/off the electric circuit, and is driven with the control means CTL (signal from the solenoid control block SCT) to switch the on (energization)/off (non-energization) state of the switching element SS. In this manner, generation/cancelation of attraction force of the solenoid SOL is switched. For example, as the switching element SS, a MOS-FET, an IGBT, or a relay can be used.

(Second Energization Quantity Acquiring Means (for Solenoid SOL) ISA)

An energization quantity acquiring means (for example, current sensor) for solenoid ISA is disposed. The energization quantity acquiring means ISA acquires an energization quantity (actual measurement value) Isa of the solenoid SOL. For example, the solenoid current sensor ISA can detect, as the Isa, a value of current actually flowing in the solenoid SOL.

<<Control Means CTL>>

The control means CTL adjusts the energization state (finally, the magnitude and direction of a current) to the electric motor MTR based on the target pressing force (target value) Fbt to control the output and rotating direction of the electric motor MTR. The control means CTL adjusts the energization states to the electric motor MTR and the solenoid SOL based on the necessity/unnecessity determination result FLpk of the parking brake to control an interlocking operation of the lock mechanism LOK. The control means CTL is a control algorithm which is programmed in the processor CPUw in the drive circuit DRV.

The control means CTL includes a designation energization quantity calculation block IST, a pressing force feedback control block IBT, an energization quantity adjustment calculation block IMT, a pulse width modulation block PWM, the switching control block SWT, a parking brake control block IPK, and a solenoid control block SCT.

The control means CTL includes control which exerts the two functions of the normal brake and the parking brake. In the CTL, a selecting means SNT in the energization quantity adjustment calculation block IMT selects one of the two functions. For this reason, the two functions do not simultaneously operate. More specifically, the normal brake function is selected when a driver operates the braking operation member BP, and the parking brake function is selected when the driver does not operate the function.

[Normal Brake Function]

A functional block according to the normal brake will be described first. The normal brake mentioned here is a brake function depending on operations, such as deceleration of a driving vehicle and maintaining of a vehicle stop state, of the braking operation member BP by a driver. The normal brake function includes the designation energization quantity calculation block IST, the pressing force feedback control block IBT, the energization quantity adjustment calculation block IMT, the pulse width modulation block PWM, and the switching control block SWT.

(Designation Energization Quantity Calculation Block IST)

The designation energization quantity calculation block IST calculates a designation energization quantity Ist based on the target pressing force Fbt determined based on the braking operation quantity Bpa and preset calculation characteristics (calculation maps) CHs1 and CHs2. The designation energization quantity Ist is a target value of an energization quantity to the electric motor MTR to achieve the target pressing force Fbt. A calculation map of the designation energization quantity Ist includes the two characteristics CHs1 and CHs2 in consideration of the hysteresis of the braking means BRK.

The energization quantity is state quantity (variable) to control output torque from the electric motor MTR. The electric motor MTR can use a current target value of the electric motor MTR as the target value of energization quantity to output a torque being almost proportional to a current. When a supply voltage to the electric motor MTR increases, the current is consequently increased. For this reason, a supply voltage value can be used as the target energization quantity. Furthermore, since the supply voltage value can be adjusted by a duty ratio in pulse width modulation, the duty ratio can be used as the energization quantity.

(Pressing Force Feedback Control Block IBT)

The pressing force feedback control block IBT calculates the pressing force feedback energization quantity Ibt based on the target pressing force (target value) Fbt and the actual pressing force (actual measurement value) Fba. The pressing force feedback energization quantity Ibt is calculated based on a deviation (pressing force deviation) ΔFb between the target pressing force Fbt and the actual pressing force Fba and a preset calculation characteristic (calculation map) CHb. The designation energization quantity Ist is calculated as a value corresponding to the target pressing force Fbt. However, a variation in efficiency of the braking means BRK may cause an error between the target pressing force Fbt and the actual pressing force Fba. Thus, the Ist is determined to reduce the error.

(Energization Quantity Adjustment Calculation Block IMT)

The energization quantity adjustment calculation block IMT calculates the target energization quantity Imt serving as a final target value to the electric motor MTR. In the normal brake, in the energization quantity adjustment calculation block IMT, the designation energization quantity Ist is adjusted by the pressing force feedback energization quantity Ibt to calculate the target energization quantity Imt.

More specifically, the feedback energization quantity Ibt is added to the designation energization quantity Ist to calculate the target energization quantity Ims. The selecting means SNT in the energization quantity adjustment calculation block IMT selects and outputs the target energization quantity Ims as the final target energization quantity Imt.

The rotating direction of the electric motor MTR is determined based on the sign (positive/negative value) of the target energization quantity Imt, and an output (rotating power) of the electric motor MTR is controlled based on the magnitude of the target energization quantity Imt. More specifically, when the sign of the target energization quantity Imt is a positive sign (Imt>0), the electric motor MTR is driven in the forward rotating direction (direction in which the pressing force increases). When the sign of the Imt is a negative sign (Imt<0), the electric motor MTR is driven in the reverse rotating direction (direction in which the pressing force decreases). The output torque of the electric motor MTR is controlled to increase when the absolute value of the target energization quantity Imt is large, and controlled to decrease when the absolute value of the Imt is small.

(Pulse Width Modulation Block PWM)

The pulse width modulation block PWM caclulates a designation value (target value) to perform pulse width modulation (PWM, Pulse Width Modulation) based on the target energization quantity Imt. More specifically, the pulse width modulation block PWM determines a duty ratio Dut of pulse widths (ratio of a pulse width (on state) to a period of a periodical pulse wave) based on the target energization quantity Imt and the preset characteristic (calculation map). In addition, the pulse width modulation block PWM determines the rotating direction of the electric motor MTR based on the sign (positive sign or negative sign) of the target energization quantity Imt. For example, as the rotating direction of the electric motor MTR, a positive (pulse) value is set as a forward rotating direction, and a negative (minus) value is set as a reverse rotating direction. Since a final output voltage is determined by the input voltage (power supply voltage) and the duty ratio Dut, the PWM determines the rotating direction of the electric motor MTR and the energization quantity to the electric motor MTR (i.e., output of the electric motor MTR).

Furthermore, in the pulse width modulation block PWM, so-called current feedback control can be executed. In this case, the detection value (for example, an actual current value) Ima of the energization quantity acquiring means IMA is input to the pulse width modulation block PWM. The duty ratio Dut is corrected (finely adjusted) based on a deviation ΔIm between the target energization quantity Imt and the actual energization quantity Ima. The current feedback control can achieve accurate motor control.

(Switching Control Block SWT)

The switching control block SWT outputs drive signals to the switching elements (S1 to S4) constituting the bridge circuit HBR based on the duty ratio (target value) Dut. The drive signal designates each of the switching elements to be in an energization state or a non-energization state. More specifically, when the electric motor MTR is driven in the forward rotating direction based on the duty ratio Dut, the S1 and S4 are turned on (on state), the S2 and S3 are turned off (off state), and the on/off states of the S1 and S4 are switched depending on an energization time (energization period) corresponding to the Dut. Similarly, when the electric motor MTR is driven in the reverse rotating direction, the S1 and S4 are controlled to be turned off (off state), the S2 and S3 are controlled to be turned on (on state), and the on/off states (on/off switching period) of the S2 and S3 are adjusted based on the duty ratio Dut. When the Dut is large, an energization time per unit time is elongated to allow a larger current to flow in the electric motor MTR.

[Parking Brake Function]

A functional block according to a parking brake will be described below. In the parking brake, the stop state of the vehicle is maintained when the driver does not operate the braking operation member BP. The parking brake has two operations, i.e., a "start operation" in which an unoperating state of the parking brake is switched to an operating state and a "release operation" in which the operating state changes into the unoperating state. The start and the release are determined based on a change (0→1, or 1→0) of the designation signal FLpk. The parking brake function includes the parking brake control block IPK, the energization quantity adjustment calculation block IMT, the pulse width modulation block PWM, the switching control block SWT, and the solenoid control block SCT.

(Parking Brake Control Block IPK)

The parking brake control block IPK calculates a parking brake target energization quantity Ipk and a solenoid energization designation signal FLs based on the control flag FLpk representing whether the parking brake is necessary or unnecessary, the pressing force (actual measurement value) Fba, and a rotating angle (actual measurement value) Mka of the electric motor MTR.

The parking brake control block IPK receives an operation start command (switching from "0" to "1" in the determination result FLpk) of the parking brake to output the parking brake target energization quantity Ipk to control the electric motor MTR and a solenoid designation signal FLs designating energization to the solenoid SOL. The Ipk mentioned here is a target value of energization quantity of the electric motor MTR in normal brake control and is determined depending on a preset characteristic. The signal FLs is a control flag. The flag "FLs=0" designates the solenoid SOL to be turned off, and the flag "FLs=1" designates the solenoid SOL to be turned on.

(Energization Quantity Adjustment Calculation Block IMT, Pulse Width Modulation Block PWM, and Switching Control Block SWT)

The energization quantity adjustment calculation block IMT adjusts the target energization quantity Ims for normal brake and the target energization quantity Ipk for parking brake. The selecting means SNT is disposed in the energization quantity adjustment calculation block IMT to select one of the Ims and the Ipk so as to output the final target energization quantity Imt. More specifically, the selecting means SNT selects the larger value of the normal brake target value Ims and the parking brake target value Ipk as the final target value Imt. The selecting means SNT can suppress interference between the target energization quantity Ims of the normal brake and the target energization quantity Ipk of the parking brake. Since the pulse width modulation block PWM and the switching control block SWT are the same as those described above, a description thereof will not be given.

(Solenoid Control Block SCT)

The solenoid control block SCT determines a drive signal to switch the on/off state of the switching element SS based on the solenoid drive command signal (control flag) FLs. More specifically, base on "FLs=0", a drive signal turning off the switching element SS is output. Base on "FLs=1", a drive signal turning on the switching element SS is output.

<<Electric Motor MTR and Rotating Angle Acquiring Means MKA>>

As the electric motor MTR, a motor with brush (also called a brush motor) is employed. In the brush motor, currents flowing in an armature (electromagnet obtained by a coil) are switched depending on a rotating phase by a mechanical commutator (commutator) CMT and a brush BLC. In the brush motor, a stator is configured by a permanent magnet, and a rotor is configured by a winding circuit (electromagnet). The brush BLC is brought into contact with the commutator CMT to supply electric power to the winding circuit (rotor). The brush BLC is pressed against the commutator CMT with a spring (elastic member) to rotate the commutator CMT so as to commutate a current.

The rotating angle acquiring means MKA acquiring (detecting) a rotating angle (actual measurement value) Mka of the rotor is disposed on the electric motor MTR. The MKA is disposed coaxially with the electric motor MTR to transmit the rotating angle Mka to the processor CPUw. For example, the MKA outputs the Mka as a digital value.

As the electric motor MTR, a brushless motor can be employed in place of the motor with brush. In the brushless motor, a current is commutated by using an electronic circuit in place of the mechanical commutator CMT of the motor with brush. In the brushless motor has a structure in which a rotor and a stator are a permanent magnet and a winding circuit (electromagnet), respectively. The rotating position Mka of the rotor is detected, and a switching element is switched depending on the Mka to commutate a supply current.

<<Pressing Force Acquiring Means FBA and Analog-digital Conversion Means ADH>>

The pressing force acquiring means FBA acquires (detects) the force (pressing force) Fba applied when the pressing member PSN presses the friction member MSB. More specifically, the pressing force acquiring means FBA detects the pressing force Fba based on an electric change (for example, a change in voltage) such as a strain gauge caused by displacement (i.e., strain) caused when the pressing force acquiring means FBA receives force.

The pressing force acquiring means FBA is disposed between the screw member NJB and the caliper CRP. For example, the pressing force acquiring means FBA is fixed to the caliper CRP, and reaction (counteraction) applied to the pressing member PSN with the friction member MSB is acquired as the pressing force Fba.

The pressing force (actual measurement value) Fba is transmitted to the processor CPUw through an analog-digital conversion means (AD conversion means) ADH. For example, a detection signal of the FBA, which is an analog value, is converted by the analog-digital conversion means ADH into a digital value, and the digital signal is input to the control means CTL. At this time, depending on the number of bits of the conversion means ADH, a resolution (least significant bit, LSB: Least Significant Bit) of the precessing force Fba is determined.

<<Lock Mechanism LOK (Solenoid SOL, Ratchet Wheel RCH, and Pawl Member TSU>>

The caliper CRP includes the parking brake lock mechanism LOK such that the pressing force Fba (force applied when the friction member MSB presses the rotating member KTB) is maintained even though the electric motor MTR and the solenoid SOL are turned off. The lock mechanism LOK includes the solenoid SOL, the pawl member TSU, and the ratchet wheel RCH.

The ratchet wheel RCH is rotatably supported by the caliper CRP. The solenoid SOL is fixed to the caliper CRP, and has a distal end (push bar) pressing the pawl member TSU against the ratchet wheel RCH. The pawl member TSU is interlocked with the ratchet wheel RCH to restrict the rotating motion of the ratchet wheel RCH. In this manner, the movement of the pressing member PSN is regulated. Even though power supply to the braking means BRK is stopped, the pressing force Fba is held, and the parking brake function is exerted.

<Lock Mechanism LOK for Parking Brake>

Figure 4A:
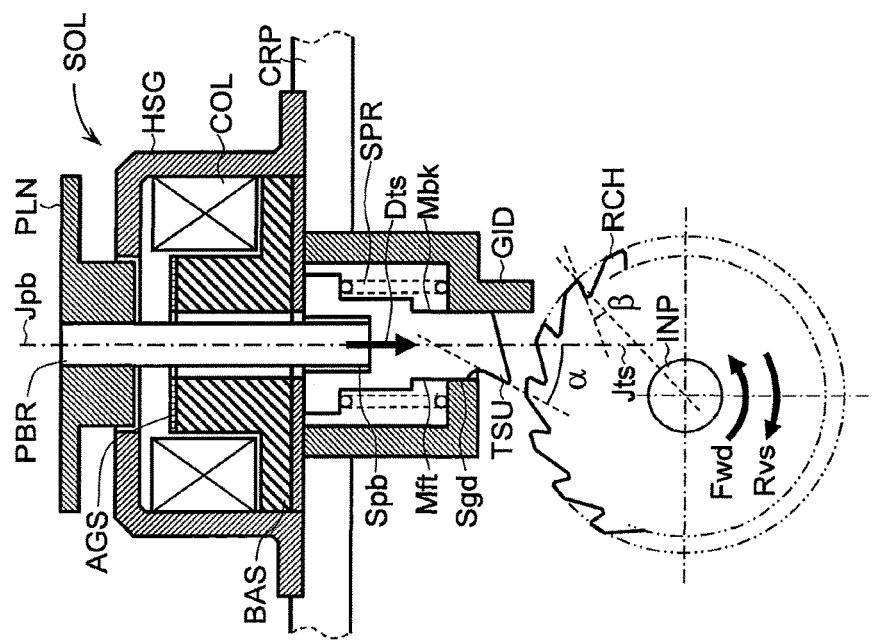

FIGS. 4A and 4B are schematic view for explaining details of the lock mechanism for parking brake (to be simply referred to as a lock mechanism) LOK. The lock mechanism LOK, which is configured as a latchet mechanism (pawl brake) and allows rotation in one direction (direction indicated by an arrow Fwd and direction in which the pressing force increases), restricts rotation in the other direction (direction indicated by an arrow Rvs and direction in which the pressing force decreases). FIG. 4A shows a state in which the parking brake is released, and FIG. 4B shows a state in which the normal brake operates. The lock mechanism LOK includes the solenoid SOL, the pawl member TSU, the guide member GID, the ratchet wheel RCH, and the elastic member SPR.

The solenoid SOL is fixed to the caliper CRP. When the lock mechanism LOK changes from the release state to the operation state, the solenoid SOL is turned on to cause the push bar PBR serving as a part of the solenoid SOL to press the pawl member TSU against the ratchet wheel RCH. More specifically, the force from the solenoid SOL is applied to the pawl member TSU in a direction (interlocking direction) Dts which is parallel with a central axis Jpb of the push bar PBR and in which the pawl member TSU comes close to a rotating axis Jrc of the ratchet wheel RCH. The pawl member TSU is positioned with the guide member GID fixed to the caliper CRP and allowed to move in only the interlocking direction Dts and the opposite direction (release direction) Dtr thereof. The interlocking direction Dts and the release direction Dtr mentioned here are collectively called "first linear directions". More specifically, the guide member GID prevents the pawl member TSU from moving in a direction inclined with respect to the first linear directions. The pawl member TSU is interlocked with the ratchet wheel RCH to exert the parking brake function. The pawl member TSU, which is not rotationally moved around a certain supporting point, is linearly moved with the solenoid SOL to be interlocked with the ratchet wheel RCH. The ratchet wheel RCH is supported to be rotatable with reference to the caliper CRP.

<<Solenoid Actuator SOL>>

The solenoid actuator (to be simply referred to as a solenoid) SOL is an electromagnetic function member converting electric energy into mechanical linear motion. The solenoid SOL includes a coil COL, a fixed iron-core (to be referred to as a base) BAS, a movable iron-core (to also be referred to as a plunger) PLN, the push bar PBR, a housing HSG, and an air gap spacer AGS.

The coil COL and the base BAS are housed in the housing HSG and fixed therein. The housing HSG is fixed to the caliper CRP. More specifically, the solenoid SOL is fixed to the caliper CRP.

The coil COL includes a bobbin, a copper wire, a lead wire, and an armoring tape. A current is caused to flow in the copper wire (conductive wire) to generate a magnetic field. When a magnetic field is generated in the coil COL by energization, a magnetic flux passes through the fixed iron-core (base) BAS to allow the BAS to attract the movable iron-core (plunger) PLN. The plunger PLN is always attracted to the base BAS during the energization. However, when the energization is stopped, the attraction force is eliminated. The plunger PLN is made of a magnetic material and a constituent component of the reciprocally moving solenoid SOL.

The push bar PBR is fixed to the plunger PLN. Thus, the plunger PLN and the push bar PBR are integrated with each other, and an operation of pressing the PBR against the pawl member TSU is performed depending on the attraction operation of the PLN. The air gap spacer AGS is mounted between the plunger PLN and the base BAS. The air gap spacer AGS stops the energization to the solenoid SOL to make it possible to reduce an influence of residual magnetism when the plunger PLN returns to the original position.

<<Pawl Member TSU>>

The pawl member TSU has a projecting portion (pawl) Tme formed at one end thereof. The projecting portion Tme is interlocked with the ratchet wheel RCH. In this case, when the pawl member TSU and the ratchet wheel RCH are interlocked with each other, contact surfaces of the projecting portion (pawl) Tme of the TSU and the teeth of the RCH are called contact portions (interlocked portions). The other end of the pawl member TSU is in contact with the push bar PBR. When the solenoid SOL is turned on, the pawl member TSU is pressed with the push bar PBR and moved in a direction (interlocking direction) Dts toward the ratchet wheel RCH. The central axis Jpb of the push bar PBR and the central axis Jts of the pawl member TSU are identical to each other, the interlocking direction Dts is a direction which is parallel with the central axis Jts (i.e., central axis Jpb of the PBR) of the TSU and in which the pawl member TSU comes close to the rotating axis Jrc of the ratchet wheel RCH.

In the pawl member TSU, a portion (the other end described above) being in contact with the push bar PBR can be formed in the form of a concave shape. The push bar PBR is fitted in the concave portion (depression) of the pawl member TSU with a gap Spb. The gap Spb mentioned here is set to be relatively large. The concave portion, which does not relatively position the pawl member TSU and the push bar PBR, makes the contact state between the push bar PBR and the pawl member TSU reliable when the solenoid SOL and the pawl member TSU are mounted on the caliper CRP.

A projecting shape (pawl shape) of the pawl member TSU has a rake $\alpha$. The rake $\alpha$ mentioned here is an angle between the contact portion (interlocked surface) Stm of the pawl Tme of the pawl member TSU and the interlocking direction Dts (first linear direction). The rake $\alpha$ allows the contact surface Stm of the pawl member TSU (i.e., the pawl Tme) to be inclined such that the contact surface Stm comes away from a plane (central surface) Mts including the central axis Jts of the pawl member TSU and being parallel with the rotating axis Jrc of the ratchet wheel RCH when coming close to the rotating axis Jrc of the ratchet wheel RCH. In other words, the contact surface (interlocked surface) Stm of the pawl member TSU is inclined in a direction (Rvs direction) in which the ratchet wheel RCH rotates when the pressing force of the pressing member PSN decreases in the first linear direction. We can also say that the interlocked surface (plane) Stm of the TSU inclines in the direction in which the pawl member TSU comes away from the rotating axis Jrc of the ratchet wheel RCH with reference to the first linear direction. When the pawl member TSU and the ratchet wheel RCH are interlocked with each other, force of the ratchet wheel RCH is applied to the pawl member TSU on the contact portion Stm, and the rake $\alpha$ causes component force of the force to act in the interlocking direction Dts. For this reason, even after the solenoid SOL is turned off, the reliable interlocking state between the pawl member TSU and the ratchet wheel RCH can be maintained.

<<Guide Member GID>>

The guide member GID is fixed to the caliper CRP to guide movement of the pawl member TSU with reference to the ratchet wheel RCH (i.e., functions as a guide surface). More specifically, the guide member GID is formed to surround the pawl member TSU, and the pawl member TSU and the guide member GID are brought into slidable contact with each other with a relatively narrow gap Sgd. In this case, the narrow gap Sgd is set to be smaller than the gap Spb (Sgd<Spb). The pawl member TSU is allowed to slidably move in only the interlocking direction Dts and the opposite (release direction) Dtr thereof (i.e., limited to the first linear direction). The ratchet wheel RCH is positioned on the caliper CRP, and pawl member TSU is positioned with the guide member GID. For this reason, the guide member GID accurately determines a relative position between the ratchet wheel RCH and the pawl member TSU. In contrast to this, the push bar PBR and the pawl member TSU are loosely fitted to each other, and do not require relative positional accuracy therebetween.

In the shape of the guide member GID (of the guide surface), the length Lbk in the interlocking direction Dts on the opposite side (rear-surface side) of a front-surface side can be set to be larger (longer) than the length Lft in the interlocking direction Dts on a side (front-surface side) on which the projecting portion (pawl) Tme of the pawl member TSU is placed. When the pawl member TSU and the ratchet wheel RCH are interlocked with each other, force of the ratchet wheel RCH is applied to the pawl member TSU to cause bending moment to act. The rear-surface side dimension Lbk is set to be relatively long to make it possible to suppress the pawl member TSU from being flexurally deformed. As a result, the pawl member TSU can secure sufficient bending strength, and smooth motion of the pawl member TSU can be maintained.

<<Ratchet Wheel RCH>>

The ratchet wheel RCH is fixed to the input member INP and rotated integrally with the INP. The ratchet wheel RCH, which is not like a general gear, has directional teeth (saw teeth) formed thereon. The "saw tooth" shapes gives a directional property to rotational motion of the ratchet wheel RCH around the rotating axis Jrc. More specifically, motion (motion in a direction in which the PSN comes close to the KTB, the Fba increases, and the braking torque increases) Fwd corresponding to the forward rotating direction of the electric motor MTR is allowed, and motion (motion in a direction in which the PSN comes away from the KTB, the Fba decreases, and the braking torque decreases) Rvs corresponding to the reverse rotating direction of the electric motor MTR is restricted (locked).

The tooth-like shapes of the ratchet wheel RCH each have an inclination angle $\beta$ such that the tooth-like shape is interlocked with the pawl member TSU having the rake $\alpha$. The inclination angle $\beta$ is an angle between a plane Mhs constituted by a distal end (tooth top) of the ratchet wheel RCH and the rotating axis Jrc and the interlocked portion (contact surface) Stm. Since the plane Mhs is a plane axially dividing the ratchet wheel RCH by two, the plane Mhs is called a "dividing plane". The inclination angle $\beta$ allows the contact surface Stm of the ratchet wheel RCH to be inclined in a direction in which the contact surface Stm comes away from the divided surface Mhs when the contact surface Stm comes close to the rotating axis Jrc. In other words, when the pawl member TSU and the ratchet wheel RCH are interlocked with each other, the contact surface (interlocked surface) Stm of the ratchet wheel RCH is inclined in a direction (Rvs direction) in which the ratchet wheel RCH rotates when the pressing force of the pressing member PSN decreases in the first linear direction. We can also say that, in the interlocking state, the interlocked surface (plane) Stm of the RCH inclines in the direction in which the pawl member TSU comes close to the rotating axis Jrc of the ratchet wheel RCH with reference to the first linear direction. When the interlocked portion Stm is on the plane being parallel with the Dts direction and including the rotating axis Jrc, the inclination angle $\beta$ is identical to the rake $\alpha$. However, when the central axis Jpb of the push bar PBR (i.e., the central axis Jts of the pawl member TSU) is set to be offset in a direction in which the contact portion Stm moves in rotation of the ratchet wheel RCH in the Rvs direction, the inclination angle $\beta$ becomes smaller than the rake $\alpha$.

When the ratchet wheel RCH and the pawl member TSU are interlocked with each other, rotation of the input member INP (Rvs direction) corresponding to a direction in which the pressing member PSN (i.e., the friction member MSB) comes away from the rotating member KTB is locked. More specifically, the reverse rotation of the electric motor MTR is regulated.

<<Elastic Member SPR>>

The elastic member (for example, return spring) SPR, which is compressed, is disposed between the guide member GID (i.e., the caliper CRP) and the pawl member TSU. Thus, the elastic member SPR always presses the pawl member TSU in the opposite direction (release direction) Dtr of the interlocking direction Dts with reference to the guide member GID (caliper CRP). The plunger PLN is drawn into the solenoid SOL when the solenoid SOL is turned on, and the push bar PBR presses the pawl member TSU in the interlocking direction Dts. More specifically, interlocking force in the interlocking direction Dts applied to the pawl member TSU by the movable member PBR of the solenoid SOL is generated. When attraction force (interlocking force) of the solenoid SOL is greater than the pressing force, which is obtained by the elastic member SPR (and which is spring force and release force pressing the TSU in the release direction Dtr), the pawl member TSU is moved to a position Pkm to be interlocked with the ratchet wheel RCH. However, when the solenoid SOL is turned off, the attraction force (holding force) of the plunger PLN is lost, and the elastic member SPR returns the pawl member TSU and the push bar PBR (plunger PLN) to a position Pkj. The position Pkm is a position (interlocked position) where the pawl member TSU and the ratchet wheel RCH are interlocked with each other, and the position Pkj is a position where the pawl member TSU and the ratchet wheel RCH are not interposed with each other (release position).

[Change to Interlocking State between Pawl Member TSU and Ratchet Wheel RCH]

The outline of each member of the lock mechanism LOK has been described above. A change from a non-interlocking state between the pawl member TSU and the ratchet wheel RCH to an interlocking state therebetween will be described below with reference to FIGS. 4A and 4B.

FIG. 4A shows a case in which the pawl member TSU and the ratchet wheel RCH are not interlocked with each other when the solenoid SOL is in an off state. At this time, the pawl member TSU is pressed against the solenoid SOL (or the caliper CRP) with the elastic force of the elastic member SPR. The position of the pawl member TSU is called the release position Pkj.

The electric motor MTR is turned on to be driven in the forward rotating direction Fwd, and the pressing force Fba is increased accordingly. After the Fba reaches a predetermined value, the solenoid SOL (i.e., the coil COL) begins to be turned on. When the solenoid SOL is turned on, the base BAS attracts the plunger PLN to attract the plunger PLN in the interlocking direction Dts. When the attraction force of the solenoid SOL (i.e., interlocking force applied when the PBR presses the TSU) becomes greater than the elastic force (release force releasing interlocking between the TSU and the RCH) of the elastic member SPR, the push bar PBR fixed to the plunger PLN moves the pawl member TSU in the Dts direction (linear direction). At this time, the guide member GID guides the movement of the pawl member TSU to suppress movement which causes (inclines) the pawl member TSU to deviate from the linear direction.

The electric motor MTR is driven in the reverse rotating direction Rvs while the pawl member TSU is in contact with the ratchet wheel RCH. As a result, as shown in FIG. 4B, the pawl member TSU is reliably interlocked with the ratchet wheel RCH. After the interlocking state is confirmed, the solenoid SOL is turned off, and the electric motor MTR is also turned off.

The rake $\alpha$ is given to the pawl member TSU, and the inclination angle $\beta$ is given to the ratchet wheel RCH to correspond to the rake $\alpha$. Force (tangential force) from the ratchet wheel RCH acts on the pawl member TSU (especially, the contact portion Stm) with rigidity of the caliper CRP, the friction member MSB, and the like. Since component force of the tangential force generated by the rake $\alpha$ acts in the interlocking direction Dts, the interlocking state after the energization is stopped can be reliably maintained.

When the contact portion Stm (distal end (tooth top) Phs of a tooth interlocked with the pawl member TSU) is parallel with the Dts direction and on a plane passing through the rotating axis Jrc of the RCH, the rake $\alpha$ (angle between the first linear direction and the Stm) and the inclination angle $\beta$ (angle between a plane extending from the Jrc to the Phs and the Stm) are identical to each other. More specifically, when a length (offset distance) Los between the plane passing through the rotating axis Jrc of the ratchet wheel RCH and the tooth top Phs is zero, $\alpha=\beta$ is satisfied. However, an increase in offset distance Los makes the inclination angle $\beta$ small. More specifically, when an angle between the plane extending from the rotating axis Jrc to the tooth top Phs and the Dts direction is given by $\theta$, a relationship given by $\alpha=\beta+\theta$ is satisfied.

[Change to Release State (Non-interlocking State) between Pawl Member TSU and Ratchet Wheel RCH]

As shown in FIG. 4B, even though the electric motor MTR and the solenoid SOL are not turned on, the interlocking state between the pawl member TSU and the ratchet wheel RCH is maintained. The electric motor MTR is turned on to release the interlocking state. At this time, the solenoid SOL is kept in an off state.

When the electric motor MTR is driven to be rotated in the forward rotating direction Fwd, the pawl member TSU goes over the tooth of the ratchet wheel RCH interlocked with the pawl member TSU. At this time, the elastic force (spring force) of the elastic member (compression spring) SPR moves the pawl member TSU in the direction (release direction) Dtr away from the ratchet wheel RCH. As a result, the interlocking state between the pawl member TSU and the ratchet wheel RCH is canceled to return to the state shown in FIG. 4A.

<Interlocking Operation between Pawl Member TSU and Ratchet Wheel RCH>
[Explanation and Definition of Component Names]

The names of the components of the pawl member TSU and the ratchet wheel RCH will be described first with reference to FIG. 5. The outer shape of the ratchet wheel RCH is formed of an arc. However, for the sake of descriptive convenience, the outer shape is expediently expressed by a linear shape.

The pawl member TSU is allowed to move in only the central axis Jts direction because the pawl member TSU is guided with the guide member GID. The direction in which the pawl member TSU comes close to the rotating axis Jrc of the ratchet wheel RCH (i.e., direction away from the solenoid SOL) is called the "interlocking direction Dts (also called the Dts direction). In contrast to this, the direction away from the rotating axis Jrc (i.e., direction close to the solenoid SOL) is called the "release direction Dtr (also called the Dtr direction)". The interlocking direction Dts and the release direction Dtr, which correspond to the "first linear directions", are opposite directions (reverse directions). Thus, the interlocking force in the Dts direction applied to the pawl member TSU with the solenoid SOL (especially the push bar PBR) and the release force in the Dtr direction applied to the pawl member TSU with the elastic member SPR are opposite to each other.

The distal end of the pawl Tme of the pawl member TSU is called a "pawl top Pts". The distal end of a tooth of the ratchet wheel RCH is called an "addendum Phs". A plane passing through the addendum Phs and being coaxial with the rotating axis Jrc of the ratchet wheel RCH is called an "addendum surface Htp". The root of a tooth of the ratchet wheel RCH is called a "dedendum", and a surface passing through the dedendum and being coaxial with the rotating axis of the ratchet wheel RCH is called a "dedendum surface Hbm".

When the pawl member TSU and the ratchet wheel RCH are interlocked with each other, a contact portion between the TSU and the RCH is called a "contact portion Stm". For example, at the contact portion Stm, the TSU and the RCH are brought into contact with each other through their surfaces (for example, planes) (interlocked by area contact). More specifically, a portion extending from the pawl top Pts of the TSU to the addendum Phs of the PCH interlocked with the pawl member TSU is the contact portion (interlocked surface) Stm. Furthermore, an angle between the contact portion (contact surface) Stm and the moving directions (linear movement) Dts and Dtr of the pawl member TSU with reference to the ratchet wheel RCH is called the "rake α".

Each of the teeth of the ratchet wheel RCH has a directional property. An inclined plane having a moderate inclination is called a "first inclined plane Hs1", and an inclined plane having a sharp inclination is called a "second inclined plane Hs2". An angle of the second inclined plane Hs2 with reference to the plane (dividing plane) Mhs formed by the addendum Phs and the rotating axis Jrc is called the inclination angle β. The rake α, the inclination angle β, and the distance (offset distance Los) from a plane parallel with the interlocking direction Dts and passing through the rotating axis Jrc to the contact portion Stm have a predetermined geometrical relationship. In this case, the interlocked surface (contact portion) Stm between the pawl member TSU and the ratchet wheel RCH is inclined in "a direction (Rvs direction) in which the ratchet wheel RCH rotates when the pressing force of the pressing member PSN decreases" with reference to the first linear direction (in FIG. 5, the first linear direction is clockwise rotated, and the interlocked surface Stm is inclined in parallel with the first linear direction). More specifically, the interlocked surface Stm of the Tme of the TSU is inclined to come away from the plane (central surface of the TSU) Mts including the central axis Jts of the TSU and being parallel with the rotating axis Jrc of the RCH when the interlocked surface Stm comes close to the rotating axis Jrc of the ratchet wheel RCH. In the interlocking state between the pawl member TSU and the ratchet wheel RCH, the interlocked surface Stm (contact portion on the second inclined plane Hs2) between the ratchet wheel RCH and the pawl member TSU is inclined in "a direction (Rvs direction) in which the ratchet wheel RCH rotates when the pressing force of the pressing member PSN decreases" with reference to the first linear direction (in FIG. 5, like the Stm of the TSU, the first linear direction is clockwise rotated, and the the Stm of the RCH is inclined in parallel with the first linear direction). More specifically, the interlocked surface Stm of the Hs2 of the RCH is inclined such that the interlocked surface Stm comes away from the plane (dividing plane of the RCH) Mhs formed by extending the rotating axis Jrc of the RCH in the addendum Phs direction when the interlocked surface Stm comes close to the rotating axis Jrc of the ratchet wheel RCH.

A tooth pitch of the ratchet wheel RCH is expressed by a "distance Lpc". A distance between the addendum surface Htp and the dedendum surface Hbm is a "height of tooth (tooth height) Hrc". A cross line between the second inclined plane Hs2 and the dedendum surface Hbm is called a "corner portion Psm". A distance from the corner portion Psm to a cross line between the first inclined plane Hs1 and the dedendum surface Hbm is a "thickness of tooth (tooth thickness) Lrc". A distance between the addendum surface Phs and the corner portion Psm is expressed by a "distance Lbt". The addendum Phs is a cross line between the addendum surface Htp and the second inclined plane Hs2. The distance Lbt is a displacement (distance) corresponding to the inclination angle β such that the pawl member TSU and the ratchet wheel RCH are interlocked with each other through their surfaces. In this case, the inclination angle β is an angle between the plane (dividing plane) Mhs extending from addendum Phs of the contact portion Stm of the RCH to the rotating axis Jrc of the RCH and the second inclined plane Hs2.

In the moving direction (rotating direction) of the ratchet wheel RCH, a direction (i.e., a direction in which the pressing force increases) corresponding to the forward rotating direction of the electric motor MTR is called in the forward rotating direction Fwd (also called an Fwd direction) of the RCH. In contrast to this, a direction (i.e., a direction in which the pressing force decreases) corresponding to the reverse rotating direction of the electric motor MTR is called the reverse rotating direction Rvs (also called an Rvs direction) of the ratchet wheel RCH. The Fwd direction and the Rvs direction are opposite directions (reverse directions). At the contact portion Stm of the pawl member TSU, a length (distance) in the Rvs direction is called a "pawl thickness Lts". More specifically, at the contact portion Stm, a dimension from a contact point with the addendum Phs to the pawl member TSU in a direction perpendicular to the central axis Jts of the pawl member TSU is the pawl thickness Lts.

[Interlocking Start Operation]

An operation of starting interlocking between the pawl member TSU and the ratchet wheel RCH (interlocking start operation of the lock mechanism LOK) will be described below with reference to FIG. 6. The interlocking start operation corresponds to the start of parking brake. States [J1] to [J3] sequentially illustrate relative positional relationships between the pawl member TSU and the ratchet wheel RCH. As in FIG. 5, the outer shape of the ratchet wheel RCH is formed of an arc. However, for the sake of descriptive convenience, the outer shape is expediently expressed by a linear shape.

The state [J1] illustrates a state in which energization to the solenoid SOL is started to bring the distal end (pawl top) Pts of the pawl Tme of the pawl member TSU into contact with the addendum surface Htp of the ratchet wheel RCH. In this state, the energization to the electric motor MTR is reduced to move the ratchet wheel RCH in the Rvs direction (movement indicated by an outline arrow). At this time, the pawl member TSU is pressed in the Dts direction with the solenoid SOL.

Furthermore, when the ratchet wheel RCH is gradually moved in the Rvs direction, as shown in the state [J2], the pawl member TSU slides along the first inclined surface (inclined surface having a small inclination) Hs1 toward the dedendum surface Hbm. Finally, as shown in the state [J3], the pawl member TSU is interlocked with the ratchet wheel RCH at the contact portion Stm. Thereafter, the energization to the solenoid SOL and the electric motor MTR are reduced to zero, the state [J3] is maintained, and the parking brake functions.

When the energization to the solenoid SOL is started, a portion of the pawl top Pts being in contact with the ratchet wheel RCH changes. However, a moving distance of the ratchet wheel RCH required for interlocking is the length of one teeth of the ratchet wheel RCH. More specifically, the maximum value of the distance required for interlocking is a value obtained by adding the teeth thickness Lpc and the distance Lbt to each other (Lpc+Lbt).

A stopper mechanism regulating movement of the pawl member TSU in the interlocking direction Dts can be disposed such that a relative position of the pawl member TSU in the interlocking direction Dts with reference to the ratchet wheel RCH is prevented from going over a predetermined marginal position. For example, the stopper mechanism is configured by a step portion formed on a side surface of the pawl member TSU having a longitudinal direction and a part of the guide member GID engaged with the step portion (see FIGS. 4A and 4B). Since the stopper mechanism allows a gap to be formed between the distal end (pawl top) Pts of the pawl member TSU and the dedendum portion Hbm of the ratchet wheel RCH while the pawl member TSU and the ratchet wheel RCH are interlocked with each other, the pawl top Pts can be suppressed from being deformed and worn.

[Interlocking Release Operation]

An operation of releasing interlocking between the pawl member TSU and the ratchet wheel RCH (interlocking release operation of the lock mechanism LOK) will be described below with reference to FIG. 7. The interlocking release operation corresponds to release of parking brake. States [J4] and [J5] sequentially illustrate relative positional relationships between the pawl member TSU and the ratchet wheel RCH. The state [J4] corresponds to the state [J3] in FIG. 6. As in FIG. 5, the outer shape of the ratchet wheel RCH is expressed by a linear shape.

The state shows a situation in which the parking brake is designated to be released while the energization to the electric motor MTR and the solenoid SOL is stopped. As shown in the state [J4], the electric motor MTR is rotated forward while the energization to the solenoid SOL is kept stopped. In this manner, the ratchet wheel RCH is moved in the Fwd direction (movement indicated by an outline arrow). Since the pawl member TSU is always given the force in the Dtr direction by the elastic member SPR, as shown in the state [J5], the pawl member TSU slides on the second inclined surface (inclined surface having a large inclination) Hs2 and moves in a direction away from the ratchet wheel RCH. When the pawl top Pts is separated from the addendum Phs, the elastic member SPR returns the pawl member TSU until the pawl member TSU is brought into contact with a stopper (the HSG of the solenoid SOL or the caliper CRP) to end the release operation of the parking brake.

[Time-series Operation of Start of Interlocking]

Figure 8A:
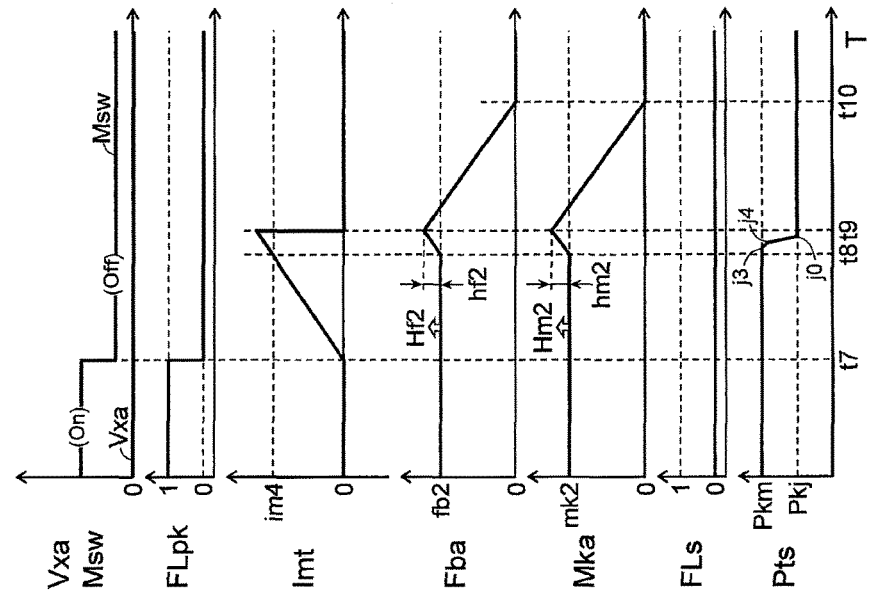
FIGS. 8A and 8B are a time-series graph for explaining a first embodiment with respect to an interlocking operation (start and release) between the pawl member TSU and the ratchet wheel RCH.
Figure 8B:
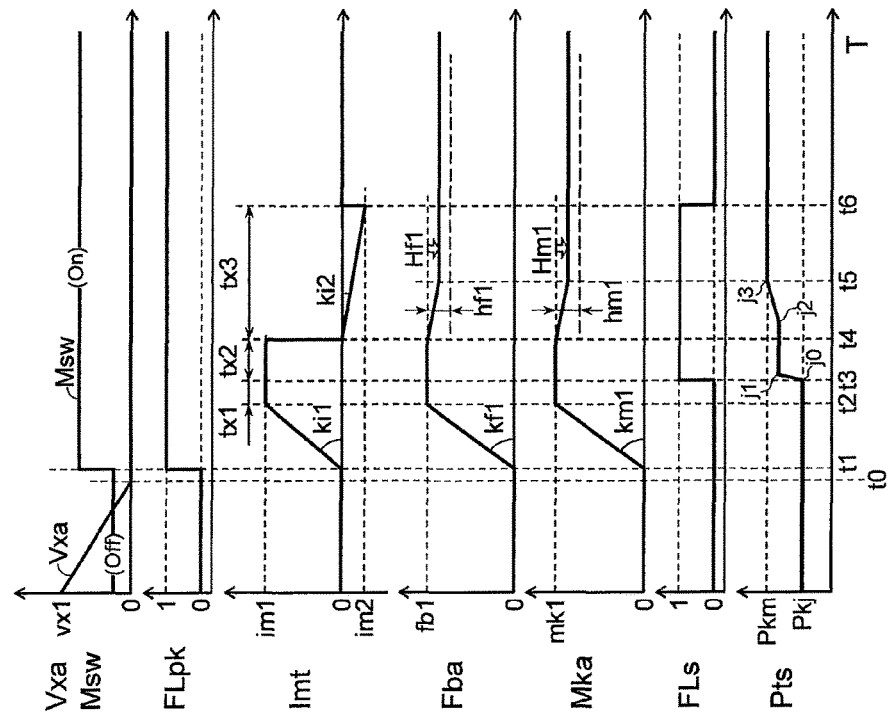

An embodiment about an interlocking start operation of the lock mechanism LOK and a release operation of the lock mechanism LOK will be described below with reference to a time-series graph in FIGS. 8A and 8B. FIG. 8A shows an interlocking start operation changing from a release state to an interlocking state. FIG. 8B shows an interlocking release operation which cancels the interlocking state. In the time-series graph, when the magnitude relations and increase/decrease of values are cumbersomely expressed in consideration of the signs of the values. For this reason, the following description, the magnitudes and increase/decrease of the values are expressed based on the magnitudes (absolute values) of the values.

The interlocking start operation of the lock mechanism LOK will be described below with reference to FIG. 8A. A running vehicle is decelerated and stopped at point of time t0, and the vehicle speed Vxa becomes zero. Thereafter, at point of time t1, a driver operates the parking switch MSW to switch the operation signal Msw from "0 (off state)" to "1 (on state)". At the same time, based on the change of the Msw, the necessity/unnecessity signal FLpk of the parking brake is switched from the "0 (unnecessity determination)" to the "1 (necessity determination)". In the parking brake control block IPK, based on the FLpk and preset characteristics, the parking brake target energization quantity Ipk is increased at an increasing inclination (i.e., a variation with time) ki1 in an energization direction (i.e., the Fwd direction of the ratchet wheel RCH) corresponding to the forward rotation of the electric motor MTR. In the energization quantity adjustment calculation block IMT selects and outputs the parking brake target energization quantity Ipk as the target energization quantity Imt. According to this, the pressing force Fba and the rotating angle Mka are increased at time inclinations kf1 and km1, respectively.

At point of time t2 at which the pressing force Fba reaches a predetermined value fb1, the target energization quantity Imt is set to a predetermined value im1, and the pressing force Fba and the rotating angle Mka are kept constant. The predetermined value fb1 is pressing force required for a parking brake, and is a predetermined value set in advance. The predetermined value fb1 can be determined based on an inclination of road. For example, the value fb1 is set to a value larger on a road inclined in the forward and backward directions of the vehicle than on a horizontal road. The road inclination can be acquired (detected) with a forward/backward acceleration acquiring means (for example, a forward/backward acceleration sensor).

At point of time t3 when a predetermined time tx1 has elapsed from point of time t2 at which the target energization quantity Imt (therefore, the Fba and the Mka) are constant, a drive signal FLs of the solenoid SOL is switched from "0 (off designation)" to "1 (on designation)". The solenoid control block SCT starts the energization to the solenoid SOL from point of time t3 based on the FLs. The solenoid SOL is turned on to move the pawl member TSU toward the ratchet wheel RCH (Dts direction). The distal end (pawl top) Pts of the pawl member TSU is brought into contact with the tooth of the ratchet wheel RCH.

At point of time t4 when a predetermined time t×2 has elapsed from point of time t3, the target energization quantity Imt is reduced to zero. Furthermore, an increase (decrease in consideration of the sign of energization quantity) of the target energization quantity Imt is started in an energization direction (Rvs direction of the ratchet wheel RCH) corresponding to the reverse rotation of the electric motor MTR. In addition, a value (stored value) mk1 of the rotating angle Mka at point of time t4 is stored.

At point of time t4, the target energization quantity Imt is rapidly made zero from an energization quantity im1 corresponding to the forward rotation direction of the electric motor MTR. In a period from point of time t4 to point of time t6, the target energization quantity Imt is moderately (gradually) increased at an increasing inclination (variation with time) ki2 in the energization direction corresponding to the reverse drive of the electric motor MTR. More specifically, the target energization quantity Imt is increased from zero (reduced from zero in consideration of the sign of energization quantity) to a predetermined energization quantity im2 (<0) corresponding to the reverse rotation of the electric motor MTR at a preset time inclination ki2 (<0). The magnitude (absolute value) of the time inclination ki2 is smaller than that of the time inclination ki1.

In a period from point of time t4 to point of time t6 (for a predetermined time t×3), when a variation (displacement) Hm1 from the stored value mkt (value of the rotating angle Mka at point of time t4) is smaller than a predetermined value hm1, the energizations to the solenoid SOL and the electric motor MTR are stopped at point of time t6. More specifically, at point of time t6, the interlocking start operation of the parking brake is ended. In this case, the predetermined value hm1 is set to a value larger than a "value (Lpc+Lbt) obtained by adding the displacement Lbt corresponding to the inclination angle β of the tooth of the ratchet wheel RCH to be interlocked with the pawl member TSU to a displacement Lpc corresponding to one pitch (interval between two adjacent teeth) of the ratchet wheel RCH" and smaller than a "displacement (2×Lpc) corresponding to two pitches of the ratchet wheel RCH". More specifically, the threshold value hm1 has a relationship given by "(Lpc+Lbt) <hm1<(2×Lpc)".

Until point of time t3, the attraction force of the solenoid SOL does not act, and the elastic member SPR presses the distal end Pts of the pawl member TSU against the housing HSG (or caliper CRP) of the solenoid SOL. For this reason, the position Pts of the pawl member TSU is at the release position Pkj (see FIG. 4A). When the energization to the solenoid SOL is started at point of time t3, the attraction force of the SOL becomes larger than the elastic force of the SPR (i.e., the interlocking force in the Dts direction applied to the TSU by the PBR becomes larger than the release force in the Dtr direction applied to the TSU by the SPR), and the pawl top Pts is moved in the Dts direction until the pawl top Pts is in contact with a tooth of the ratchet wheel RCH. The state set in the period from point of time t3 to point of time t4 corresponds to the state [J1] in FIG. 6. The change in the period from point of time t4 to point of time t5 corresponds to a change of state which finally reaches the state [J3] through the state [J2] in FIG. 6. At point of time t5, as shown in the state [J3], the pawl member TSU and the ratchet wheel RCH are completely interposed with each other, and the pawl top Pts is moved to the position Pkm. Thus, after point of time t5, even though energizations to the solenoid SOL and the electric motor MTR are made zero, the pawl top Pts is kept at the interlocking position Pkm.

[Time-series Operation of Releasing Interlocking]

An interlocking release operation of the lock mechanism LOK will be described below with reference to FIG. 8B. A case in which, when the parking brake is operating, a driver operates the parking switch MSW to cancel the operation of the parking brake is described.

The stop state of the vehicle is maintained (i.e., Vxa=0). At point of time t7, the driver operates the parking switch MSW to switch the operation signal Msw from "1 (on state)" to "0 (off state)". At the same time, based on the change of the Msw, the necessity/unnecessity signal FLpk of the parking brake is switched from the "1 (necessity determination)" to the "0 (unnecessity determination)". In the IPK, based on the FLpk and preset characteristics, the Ipk is increased in an energization direction (i.e., the Fwd direction of the ratchet wheel RCH) corresponding to the forward rotation of the electric motor MTR. The IMT selects and outputs the Ipk as the target energization quantity Imt. At this time, the drive signal FLs of the solenoid SOL is kept at "0", and the solenoid SOL is not turned on.

The pawl member TSU and the ratchet wheel RCH are interlocked with each other, the Fba and the Mka are kept at the values fb2 and mk2, respectively. The value mk2 of the rotating angle Mka at point of time t7 is stored. In an initial stage (point of time t7 to point of time t8) at the start of increase of the target energization quantity Imt, the Fba and the Mka are not increased (constant). When the pressing force Fba is increased to be larger than the value fb2, the pawl member TSU begins to slide on the Hs2 of the ratchet wheel RCH. Furthermore, when the target energization quantity Imt is increased in the energization direction (i.e., Fwd direction) in which the electric motor MTR is driven forward to increase the pressing force Fba, the pawl member TSU is disconnected from the ratchet wheel RCH, and the elastic member SPR returns the pawl top Pts to the release position Pkj.

At point of time t9 at which the variation (displacement) Hm1 from a state in which the rotating angle Mka is constant (stored value mk2 at t7) exceeds a predetermined value hm2, the target energization quantity Imt is returned to zero. According to this, the Fba and the Mka decrease to zero. The predetermined value hm2 is a value larger than the distance Lbt between the addendum surface Phs and the corner portion Psm.

<Appropriate Region of Contact Portion Stm>

A relationship between the contact portion Stm between the pawl member TSU and the ratchet wheel RCH and an inclination angle (inclination angle of the second inclined plane Hs2) β of the ratchet wheel RCH will be described below with reference to the schematic views in FIGS. 9A and 9B.

Figure 9A:
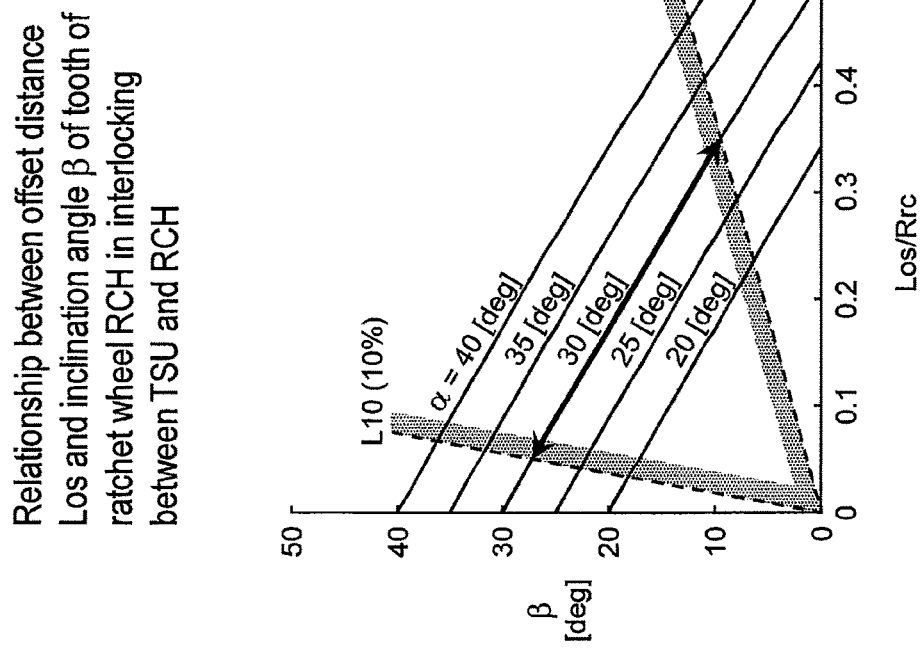
FIGS. 9A and 9B are diagrams for explaining a contact portion Stm between the pawl member TSU and the ratchet wheel RCH and an adequate region (space defined between a surface Ms1 and a surface Ms2) of a contact portion Stm.

As shown in FIG. 9A, the rake α is given to a portion (contact portion Stm) of the pawl member TSU interlocked with the ratchet wheel RCH. The contact portion Stm is a plane which is an area contact portion extending from the addendum portion Phs (blank circle) of the ratchet wheel RCH to the pawl top Pts (blank square) of the pawl member TSU. The rake α is an angle between the contact portion (interlocked surface) Stm and the interlocking direction Dts.

Layout [S1] shows a case in which the addendum Phs (indicated by a point Qa) of the contact portion Stm is placed on the plane Ms1 passing through the rotating axis Jrc of the ratchet wheel RCH and being parallel with the Dts direction. The surface Ms1 is called a "first plane".

It is assumed that the addendum Phs of the ratchet wheel RCH is rotated at an angle θ in the Rvs direction around the rotating axis Jrc of the ratchet wheel RCH. This state (state in which the addendum Phs is located at a point Qb) is indicated by layout [S2]. In layout [S2], the surface Ms2 passing through the addendum Phs of the ratchet wheel RCH and being parallel with the Dts direction is called a "second plane". The distance Los between the first plane Ms1 and the second plane Ms2 is called an "offset distance". When the radius (distance from the rotating axis Jrc to the addendum surface Htp) of the ratchet wheel RCH is given by Rrc, the offset distance Los is calculated by multiplying the radius Rrc by a sine (sin θ) (Los=Rrc×sin θ) of the angle θ. An angle obtained by adding the inclination angle β and the angle θ to each other corresponds to the rake α(α=β+θ).

Furthermore, it will be considered that the addendum Phs is rotated around the rotating axis Jrc in the Rvs direction to match the rotating angle θ with the rake α. This state (state in which the addendum Phs is located at a point Qc) is indicated by layout [S3]. In this state, the inclination angle β of the ratchet wheel RCH becomes zero, and the offset distance Los becomes "Rrc×sin α". Thus, when the pawl member TSU is interlocked with the ratchet wheel RCH on a third plane Ms3 "distance Rrc×sin α" away from the first plane Ms1, the inclination angle β of the ratchet wheel RCH can be set to zero.

Since the dimension of the tooth thickness (thickness of a tooth) Lrc depends on the inclination angle β, the inclination angle β influences the strength of the ratchet wheel RCH in the rotating direction. For example, as shown in layout [S1], when the inclination angle β is relatively large, the tooth thickness Lrc1 becomes relatively small. On the other hand, as shown in layout [S3], when the inclination angle β is relatively small, a tooth thickness Lrc3 (>Lrc1) becomes relatively large to be advantageous to the strength of the ratchet wheel RCH. Thus, when the offset distance Los is small the tooth thickness Lrc becomes small. However, when the Los is set to be large, the Lrc can be set to be large.

Figure 9B:
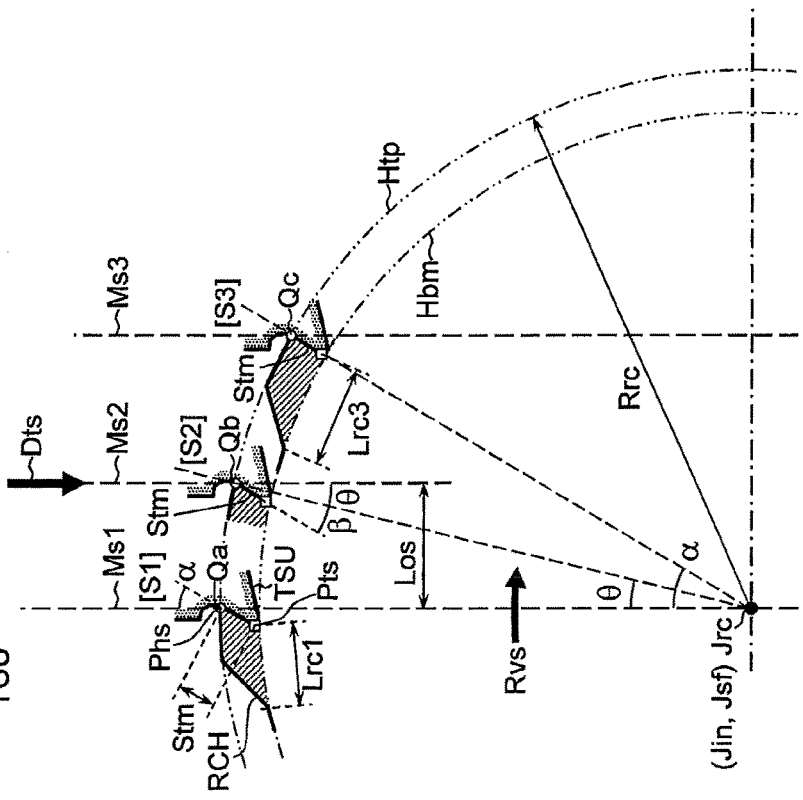

FIG. 9B collectively shows a relationship between the rake α, the offset distance Los (more specifically, value Los/Rrc obtained by dividing the offset distance by the ratchet wheel radius), and the inclination angle β. For example, when α=30 degrees, β=α=30 degrees is satisfied when Los=0 (i.e., state [S1]). The inclination angle β decreases with an increase in Los/Rrc (=sin θ). β=0 degrees is satisfied when Los/Rrc=0.5.

When the offset distance Los is made large, the inclination angle β is made small, and the tooth thickness Lrc can be set to be large. For this reason, the strength of the ratchet wheel RCH is increased. However, when the tooth thickness Lrc of the RCH is increased, the thickness Lts of the pawl member TSU becomes small (thin) to spoil the strength of the pawl member TSU. In order to satisfy the tade-off relationship, the offset distance Los is set within the range of 10 to 70% of Rrc×sin α. More specifically, in a region shown in FIG. 9B and defined between a 10% line L10 and a 70% line L70, the value Los/Rrc is set. More specifically, the L10 indicates Los=0.1×Rrc×sin α, and the L70 indicates Los=0.7×Rrc×sin α. The offset distance Los is set within the range (i.e., 0.1×Rrc×sin α≤Los≤0.7×Rrc×sin α) to make it possible to simultaneously achieve high strengths of the pawl member TSU and the ratchet wheel RCH. For example, when α=30 degrees, the value Los/Rrc is set within the range of 0.05 (i.e., 10% of a sine of 30 degrees) to 0.35 (i.e., 70% of a sine of 30 degrees) (indicated by a double-headed heavy-line arrow).

<Width of Pawl Member TSU>

The friction of the friction member MSB allows an interlocking position on the ratchet wheel RCH to change when the parking brake operates. More specifically, on the pawl member TSU, the contact portion (interlocked surface) Stm is always the same portion. On the ratchet wheel RCH, when the friction member MSB is gradually worn, interlocking is performed on different teeth (the contact portions Stm of the ratchet wheel RCH sequentially change). This event must be considered for fatigue strengths of the pawl member TSU and the ratchet wheel RCH.

FIG. 10 shows a relationship between the pawl member TSU and the ratchet wheel RCH when viewed in an A direction (indicated by an outline arrow) in FIG. 4B. A width (pawl width) Wts of the pawl member TSU is set to be wider (larger) than a tooth width Wrc of the ratchet wheel RCH. In interlocking of the lock mechanism LOK, the pawl member TSU is always interlocked at one position (i.e., the contact portion Stm). However, in the ratchet wheel RCH, the interlocking positions change with abrasion of the friction member MSB. For this reason, the pawl width Wts is made larger than the tooth width Wrc to make it possible to improve resistance to fatigue of the pawl member TSU.

A sliding position between the pawl member TSU and the guide member GID will be described below. The plane Mts including central axis Jts of the pawl member TSU and being parallel with the rotating axis Jrc of the ratchet wheel RCH is called a "central surface". With respect to the central surface Mts of the pawl member TSU, a surface of the pawl member TSU on which the projecting portion (pawl top Pts) of the pawl member TSU is placed is called a "front surface Mft (of the pawl member TSU)". With respect to the central surface Mts, a surface of the pawl member TSU on the opposite side of the front surface Mft is called a "rear surface Mbk (of the pawl member TSU)". Thus, on the pawl member TSU, the "front surface Mft" can be called a surface on a side close to the pawl Tme (especially, interlocked surface Stm), and the "rear surface Mbk" can be called a surface on a side far from the Tme (especially, Stm).

When the pawl member TSU is orthogonally divided in the Dts direction, a section of the pawl member TSU is expressed by a quadrangle Mck (P1-P2-P3-P4). The section Mck is perpendicular to the central surface Mts, and a cross line therebetween is indicated by a line segment P5 to P6. The front surface Mft of the TSU is a plane including a line segment P1 to P2 and being parallel with the central axis Jts. The rear surface Mbk of the TSU is a plane including a line segment P3 to P4 and being parallel with the central axis Jts. Thus, the front surface Mft, the central surface Mts, and the rear surface Mbk are parallel with the first linear direction.

The guide member GID slides on the Mft and the Mbk to guide the pawl member TSU. In this case, in the shape (guide surface) of the guide member GID, a dimension (length on the rear surface Mbk side) Lbk of a portion sliding on the Mbk is set to be larger in the Dts direction than a dimension (length on the front surface Mf t side) Lft of a portion sliding on the Mft (Lbk>Lft). More specifically, the length Lbk, in the first linear direction, of the guide surface on a side (rear surface Mbk side) away from the pawl Tme of the pawl member TSU is set to be larger than the length Lft, in the first linear direction, of a guide surface on a side (front surface Mft side) close to the Tme of the TSU. Force from the front side of the drawing to the rear side thereof (i.e., direction perpendicular to the central surface Mts and extending from the line segment P1 to P2 to the line segment P3 to P4) by the ratchet wheel RCH is applied to the pawl member TSU at the contact portion Stm. Although this force gives a bending moment to the pawl member TSU, since the guide surface on the rear surface Mkb side of the GID is set to be relatively long in the Dts direction (first linear direction), the pawl member TSU is suppressed from being bending-deformed. As a result, smooth motion of the pawl member TSU can be secured.

Furthermore, the pawl member TSU is disposed with the offset distance Los with reference to the ratchet wheel RCH. In this case, in positional interference to the ratchet wheel RCH, although a dimensional margin is on the Mbk side, a small dimensional margin is on the Mft side. For this reason, when the dimension Lbk in the first linear direction on the rear surface Mbk side is set to be larger than the dimension Lft in the first linear direction on the Mft side, the pawl member TSU and the ratchet wheel RCH are efficiently disposed, and the device can be miniaturized as a whole.

Different materials are employed as the materials of the pawl member TSU and the ratchet wheel RCH, and a material having a strength higher than that of the ratchet wheel RCH can be employed as the material of the pawl member TSU. For example, a steel material can be employed as the material of the pawl member TSU, and an aluminum material can be employed as the material of the ratchet wheel RCH. A combination of the pawl member TSU made of an aluminum material and the ratchet wheel RCH made of a resin material can be employed. This depends on the relationship between the fatigue strengths described above.

<Parking Brake Mechanism LOK Made in Consideration of Vibration Caused by Uneven Road Surface>

An appropriate layout of the pawl member TSU for vibration input to the wheel WHL and caused by an uneven road surface will be described below with reference to FIG. 11A to FIG. 14.

When a vehicle is running (i.e., the parking brake function is unnecessary), the pawl member TSU is pressed against the housing HSG (or the caliper CRP itself) of the solenoid SOL with the elastic force (spring force) of the elastic member (return spring) SPR. When the vehicle runs on a driving road (punishing road, steps, or the like) having an uneven surface formed thereon, the wheel WHL receives vibration caused by the uneven road surface. Since the pawl member TSU has a mass (its own weight), the pawl member TSU may be moved by the road surface vibration (generated acceleration). More specifically, the pawl member TSU pressed on the housing HSG side with the elastic member SPR may be separated from the housing HSG (or caliper CRP). In this case, since an unnecessary parking brake operation may undesirably occur, the spring constant (or an initial load) of the elastic member (return spring) SPR is set to a large value to reliably maintain the pressed state of the pawl member TSU against the load-surface vibration. However, when the elastic member SPR having a large spring constant (or initial load) is employed, in an operation of the parking brake, the attraction force of the solenoid SOL must be increased against the elastic member SPR. As a result, the braking device is increased in size as a whole. Thus, to miniaturize the braking device, it is important to suppress an acceleration input in the moving direction of the pawl member TSU.

<Distribution of Wheel Accelerations Gw when Vehicle Runs on Road Having Large Unevenness>

Figures 11A, 11B:
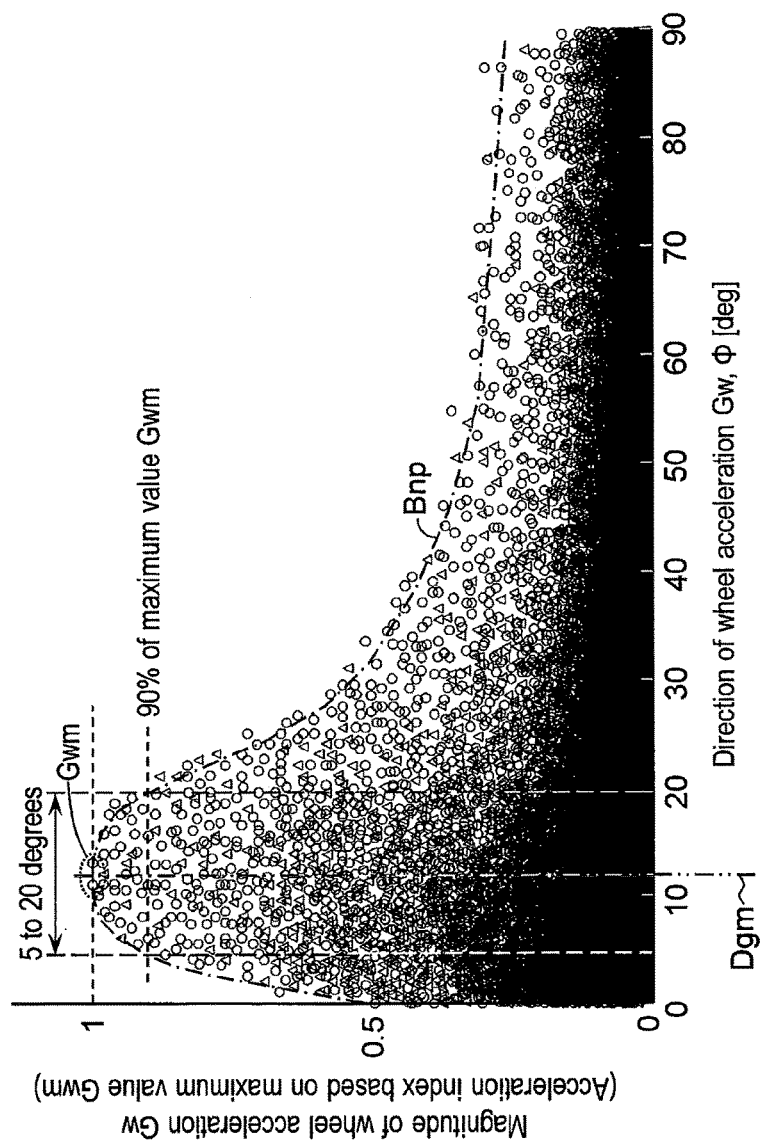
FIGS. 11A and 11B are diagrams for explaining an experiment result of an acceleration acting on a wheel.

FIGS. 11A and 11B show an experiment result obtained by actually measuring an acceleration (wheel acceleration) Gw acting on each wheel WHL of a vehicle which runs on a road having large unevenness. As shown in an upper part of FIG. 11A, the wheel WHL rotationally moves forward and collides with a projecting portion on a road surface GRN. At this time, the wheel receives force from the road surface to generate the wheel acceleration Gw. An accelerometer GS which can measure accelerations Gh (horizontal direction) and Gv (vertical direction) in two axial directions orthogonal to each other was disposed on the wheel WHL to perform actual measurement. More specifically, the accelerometer GS was attached to a suspension arm to be close to the rotating member KTB as much as possible to measure components the Gh and Gv of the wheel acceleration Gw.

A lower part in FIG. 11A shows a measurement result obtained when a vehicle actually runs on a road on which uneven road surfaces continue at random. In this case, the acceleration Gh shows a horizontal (forward and backward directions of the vehicle), and the acceleration Gv shows a vertical direction (upper and lower directions of the vehicle). In this case, the road on which uneven road surfaces continue at random is called a "punishing road". A road having a step formed on the road surface is called a "step road".

FIG. 11B shows an experiment result obtained by examining a distribution of the magnitudes of the accelerations Gw acting on the wheel WHL and directions of the accelerations Gw when the vehicle runs on the punishing road and the step road at various speeds. The magnitudes and directions of the wheel accelerations Gw (vectors) are calculated based on the measured accelerations Gh and Gv. An abscissa (direction of the wheel acceleration Gw) is expressed by an angle $\phi$ with reference to the vertical direction (upper and lower directions of the vehicle), and, as an ordinate (magnitude of the wheel acceleration Gw), a value (acceleration index) divided by a maximum value Gwm of the generated Gw. Each circle and each quadrangle indicate measurement results obtained at points of measurement time, respectively.

When the wheel WHL of a running vehicle collides with an unevenness on the road surface, the wheel WHL is forced by the road surface. This force acts in not only the upper and lower directions of the vehicle but also the forward and backward directions of the vehicle. The force acting on the wheel WHL generates the acceleration Gw on the wheel WHL. The magnitude and direction of the wheel acceleration Gw depend on a vehicle speed, sizes of unevennesses (heights) on the road surface, characteristics of suspensions, and the like.

As is apparent from the experiment results, in a distribution Bnp of the wheel accelerations Gw, the relatively high acceleration Gw increases with an increase in angle $\phi$, and the number of accelerations Gw is maximum (has a peak) at a certain angle. More specifically, at an angle of $\phi \approx 12.5$ degrees (direction Dgm having about 12.5 degrees with reference to a vertical direction Den), a maximum value Gwm of the wheel acceleration Gw is generated. When the angle $\phi$ further increases, the magnitude of the wheel acceleration Gw gradually decreases. An angle (direction) at which the maximum acceleration Gwm is generated is called a peak direction Dgm. A relatively large of the wheel accelerations Gw is generated when the road-surface unevenness is large and the vehicle speed is high to some extent. In this case, force applied to the wheel WHL from the road surface acts in not only the upper and lower directions of the vehicle but also the forward and backward direction of the vehicle. For example, the wheel acceleration Gw having 90% or more of the maximum value Gwm is distributed in a region (near the peak direction Dgm) in which the directions $\phi$ fall within the range of 5 to 20 degrees.

<Appropriate Layout of Pawl Member TSU for Vibration from Road Surface>

An appropriate layout of the pawl member TSU and the central axis Jts will be described below with reference to FIG. 12 and FIG. 13 obtained when viewing a side of the wheel WHL.

As is apparent from the experiment result (running results on the punishing road, the step road, and the like by a test vehicle) in FIGS. 11A and 11B, a relatively large of the wheel accelerations Gw (for example, 90% or more of the maximum value of the wheel accelerations Gw) is distributed in a direction (near the peak direction Dgm) inclined at about 5 to 20 degrees with reference to the upper and lower directions (vertical directions) Den of the vehicle. The central axis Jts of the pawl member TSU is disposed perpendicularly to the region ($\phi$=5 to 20 degrees) to reduce an acceleration component input in the moving direction of the pawl member TSU. More specifically, the central axis Jts (i.e., interlocking direction Dts) of the pawl member TSU is disposed with inclinations of 5 to 20 degrees with reference to the forward and backward directions Dsh o the vehicle in a horizontal plane SMkt including a rotating axis Jkt (i.e., a rotating axis Jwh of the wheel WHL) of the rotating member KTB. In other words, the interlocking direction Dts is set such that the horizontal plane SMkt including the rotating axis Jkt of the rotating member KTB is opposite to a direction of a rotating direction (indicated with an outline arrow) of the rotating member KTB when the vehicle runs forward around the rotating axis Jkt of the rotating member KTB, parallel with a plane (inclined plane) KMts inclined at 5 to 20 degrees, and perpendicular to the rotating axis Jkt of the rotating member KTB. In this case, the "opposite direction of the rotating direction of the rotating member KTB (i.e., the wheel WHL) when the vehicle runs forward" is called a "wheel reverse rotating direction". Thus, the "wheel reverse rotating direction" can also be called a "rotating direction of the rotating member KTB when the vehicle runs backward".

The peak direction Dgm (direction in which the acceleration maximum value Gwm is generated) depends on a traveling direction (forward direction) of the vehicle. More specifically, the peak direction Dgm is inclined in the opposite direction of the rotating direction of the wheel WHL around the rotating axis Jwh of the wheel WHL with reference to the vertical (upper and lower directions of the vehicle) Den. For this reason, the central axis Jts of the pawl member TSU is preferably inclined at an angle of 5 to 20 degrees with reference to the forward direction (horizontal direction) Dsh of the vehicle, and manners of inclination of the central axis Jts of the pawl member TSU with reference to the horizontal plane change depending whether the braking means BRK is located in front of or at the rear of the vehicle. For this reason, the manners will be separately described in two cases.

A case in which the braking means BRK is located on the front side of the vehicle forward direction (called a "forward layout" in which a caliper CRPa is mounted) will be described first with reference to FIG. 12. More specifically, the caliper CRPa is disposed on the forward side (i.e., front side) of the vehicle with reference to a plane (vertical plane) perpendicular to the road surface and including the rotating axis Jwh (coaxially with the rotating axis Jkt of the rotating member KTB) of the wheel WHL. Central axes Jtsa and Jtsc of the pawl member TSU are disposed such that the horizontal plane SMkt including the rotating axis Jkt of the rotating member KTB is parallel with the plane (inclined plane) KMts inclined at an angle $\psi$ in a direction (i.e., the wheel reverse rotating direction) opposite to the rotating direction of the rotating member KTB in forward traveling of the vehicle and orthogonal to the rotating axis Jkt of the rotating member KTB. The angle $\psi$ is set within the range of 5 to 20 degrees.

A relatively large of the wheel accelerations Gw is distributed in a region (being near the peak direction Dgm and called a peak region) inclined backward at 5 to 20 degrees with reference to the vertical direction Den. Thus, on the front side of the wheel WHL, the central axes Jtsa and Jtsc of the pawl member TSU are disposed in a direction (i.e., direction perpendicular to the peak region) inclined at an angle of about 5 to 20 degrees from the horizontal direction Dsh of forward traveling of the vehicle in the wheel reverse rotating direction. For this reason, a Jts direction component (component in a $\psi$ direction) Gts of the wheel acceleration Gw is suppressed to a relatively small value. As a result, the magnitude of the acceleration Gts applied in the moving direction of the pawl member TSU is suppressed to make it possible to miniaturize the solenoid SOL.

The braking means BRK is configured by at least two axes (see FIG. 2). More specifically, the rotating axis Jmt (coaxial with the rotating axis Jin of the input member INP and the rotating axis Jrc of the ratchet wheel RCH) of the electric motor MTR and the central axis Jps (coaxial with the rotating axis Jsf of the shaft member SFT) of the pressing member PSN are independently configured in parallel with each other. The solenoid SOL is disposed, with reference to a vertical plane EMps including the central axis Jps of the pressing member PSN, on an opposite side of intersections Ktsa and Ktsc between a horizontal plane SMps including the central axis Jps of the pressing member PSN and the central axis Jts of the pawl member TSU. For example, the intersection Ktsa is located on the right side of the drawing with reference to the vertical plane EMps. However, the solenoid SOL (indicated with a solid line) is disposed on the left side of the drawing which is the opposite side of the intersection Ktsa.

Since the pressing member PSN is restrictively disposed because the center of the friction member MSB is preferably pressed. Since the central axis Jts of the pawl member TSU is inclined with reference to the horizontal plane SMkt to reduce a vibration input, the layout of the parking brake mechanism LOK is spatially restricted. For example, when attention is given to the central axis Jtsa, the layout space of the members becomes severe because the Jtsa comes close to the SMkt on the right side of the vertical plane EMps. On the other hand, the left side of the vertical plane EMps is advantageous to the member layout space because the Jtsa comes away from the SMkt. When the solenoid SOL and the pawl member TSU are disposed away from each other, the push bar PBR (see FIGS. 4A and 4B) having a relatively large length is employed. In this case, a decrease in transmission efficiency from the solenoid SOL to the pawl member TSU, bending of the push bar PBR, and the like must be considered. Since the solenoid SOL is disposed on the opposite side of the intersections Ktsa and Ktsc (intersections between the axes Jtsa and Jtsc and the SMkt) with reference to the vertical plane EMps including the Jps, the solenoid SOL and the pawl member TSU can be disposed closely to each other. As a result, the push bar PBR having a relatively short length is employed, and the parking brake mechanism LOK can be efficiently disposed in the caliper.

The braking means BRK must be housed in the wheel WHL. However, since a hub bearing unit, a knuckle, a suspension member, and the like are disposed around the rotating axis Jkt of the wheel WHL, the braking means BRK must be reduced in dimension, especially, in a radial direction (direction close to the rotating axis Jwh of the WHL) of the wheel WHL. The solenoid SOL is disposed, with reference to a curved surface (cylindrical surface) Mps including the central axis Jps of the pressing member PSN and being coaxial with the rotating member KTB, on the opposite side (i.e., outside the cylindrical surface Mps) of the rotating axis Jkt of the rotating member KTB. With reference to the cylindrical surface Mps including the Jps and being coaxial with the Jkt, the Jkt is on the right side of the drawing, and the solenoid SOL (corresponding to the central axis Jtsa) indicated by a solid line is disposed on the left side of the drawing on the opposite side of the Jkt. Since the solenoid SOL is not disposed around the rotating axis Jkt of the wheel WHL, the braking means BRK can be miniaturized in the radial direction of the wheel WHL. In a layout of the solenoid SOL (corresponding to the central axis Jts) indicated by a broken line, the solenoid SOL is on the same side of the Jkt with reference to the Mps (i.e., inside of the Mps), the BRK cannot be shortened in the radial direction.

A case in which the braking means BRK is located on the rear side with reference to the vehicle traveling direction (a case in which a caliper CRPb is mounted and which is called a "backward layout") will be described below with reference to FIG. 13. More specifically, the caliper CRPb is disposed, with reference to a plane (vertical plane) including the rotating axis Jwh (coaxial with the rotating axis Jkt of the rotating member KTB) of the wheel WHL and perpendicular to the road surface, on the opposite side (i.e., backward) of the forward traveling direction of the vehicle. As in the case of the forward layout, central axes Jtsb and Jtsd of the pawl member TSU are disposed such that the horizontal plane SMkt including the rotating axis Jkt of the rotating member KTB is parallel with the plane (inclined plane) KMts inclined at an angle ψ(=5 to 20 degrees) in the wheel reverse rotating direction (opposite direction of the rotating direction of the wheel WHL in forward traveling of the vehicle) and perpendicular to the rotating axis Jkt of the rotating member KTB. As described above, since the central axes Jtsb and Jtsd of the pawl member TSU are inclined to be perpendicular to the peak region, the Jts direction component Gts of the wheel acceleration Gw can be suppressed to a relatively small value. As a result, as in the case of the forward layout, the magnitude of the acceleration Gts applied in the moving direction of the pawl member TSU is suppressed to make it possible to miniaturize the solenoid SOL.

As in the case of the forward layout, in the braking means BRK constituted by at least two axes, the solenoid SOL is disposed, with reference to the vertical plane EMps including the central axis Jps of the pressing member PSN, on an opposite side of intersections Ktsb and Ktsd between the horizontal plane SMps including the central axis Jps of the pressing member PSN and the central axis Jts of the pawl member TSU.

The layout of the pressing member PSN is preferentially determined to press the center of the friction member MSB. Furthermore, since the central axis Jts of the pawl member TSU is inclined with reference to the horizontal plane SMkt, the layout of the parking brake mechanism LOK is spatially restricted. The solenoid SOL is disposed on the opposite side (spatially advantageous side) of the intersections Ktsb and Ktsd (intersections between the axes Jtsb and Jtsd and the SMkt) with reference to the vertical plane EMps including the Jps. As in the case of the forward layout, the solenoid SOL and the pawl member TSU are disposed to be close to each other, and the push bar PBR can be relatively short-ened. For this reason, the parking brake mechanism LOK can be efficiently disposed in the caliper.

Furthermore, as in the case of the forward layout, the solenoid SOL (see a solenoid corresponding to the central axis Jtsb) is disposed, with reference to the curved surface (cylindrical surface) Mps including the central axis Jps of the pressing member PSN and being coaxial with the rotating member KTB, on the opposite side (outside the Mps) of the rotating axis Jkt of the rotating member KTB. Since the above described solenoid SOL is disposed at a relatively long distance from the rotating axis Jkt of the wheel WHL, the braking means BRK can be miniaturized in the radial direction of the wheel WHL.

<Effect of Case in which Central Axis Jts of Pawl Member TSU can be Appropriately Disposed>

A reduction effect of a wheel acceleration (Jts direction component of acceleration) Gts acting in the moving direction of the pawl member TSU when the central axis Jts of the pawl member TSU is set within an appropriate range will be described below with reference to FIG. 14. In FIG. 14, the wheel acceleration Gw is assumed to have an acceleration distribution indicated by a chain line Bnp in FIG. 11B, and the acceleration components Gts input in the central axis direction (which is the moving direction of the pawl member TSU, i.e., the interlocking direction Dts) of the pawl member TSU are plotted. More specifically, FIG. 14 shows a relationship between the direction φ of the wheel acceleration Gw and the Jts direction component Gts of the wheel acceleration Gw when the angle ψ between the central axis Jts of the pawl member TSU and the vehicle traveling direction (horizontal direction) Dsh on the horizontal plane is changed.

When the angle ψ (angle between the Dsh and the Jts) is set within the range of 5 to 20 degrees (more specifically, the central axis Jts of the pawl member TSU is disposed such that the horizontal plane SMkt including the rotating axis Jkt of the rotating member KTB is parallel with the plane KMts inclined at 5 to 20 degrees in the wheel reverse rotating direction and perpendicular to the rotating axis Jkt), the acceleration component Gts can be suppressed within a relatively small range. For example, in comparison with a case in which the angle ψ is set to zero (i.e., the Jts is disposed in a horizontal forward and backward directions), ψ=5 to 20 degrees (appropriate range indicated by oblique lines) is satisfied to make it possible to reduce the acceleration component Gts by 25%. As a result, a spring constant of the elastic member SPR pressing the pawl member TSU is set to be small, and an output from the solenoid SOL can be reduced. Furthermore, the brake actuator BRK can be miniaturized as a whole.

Since an approximate value of the rigidity (spring constant) of the braking means BRK is known in advance, the pressing force Fba and the rotating angle Mka of the MTR can be regarded as equivalent physical values. More specifically, a value obtained by multiplying the rigidity (predetermined value) of the braking means BRK by the rotating angle Mka corresponds to the pressing force Fba. Thus, since the Fba and Mka express a state in which the friction member MSB presses the rotating member KTB, the values are collectively called "pressing state quantities". In other words, at least one of the Fba and the Mka is a pressing state quantity. The FBA and the MKA acquiring the Fba and the Mka are called "pressing state quantity acquiring means".

In the embodiment, in place of at least one of the pressing force (actual measurement value) Fba and the rotating angle (actual measurement value) Mka, a pressing state quantity can be employed. In place of the variations (displacements)

Hm1 and Hm2, variations of the pressing state quantities can be employed. More specifically, in place of the pressing force Fba, the rotating angle Mka of the electric motor MTR can be employed. In the pressing force Fba, a variation Hf1 from the value fb1 and a variation Hf2 from the value fb2 can be employed. In this case, the predetermined values fb1, fb2, mk1, mk2, hf1, hf2, hm1, and hm2 correspond to predetermined values of the pressing state quantities, respectively.

The braking means BRK is configured by at least two different axes (multi-axial configuration), the rotating angle acquiring means MKA is disposed on the axis on which the electric motor MTR is disposed, and the pressing force acquiring means FBA is disposed on an axis on which pressing member PSN is disposed. In this case, the pressing force Fba is preferably employed as a pressing state quantity to adjust an increase of the target energization quantity Imt, and the rotating angle Mka of the electric motor MTR is preferably employed as a pressing state quantity to determine the end of energization to the solenoid SOL. The rigidity of the BRK slightly changes with abrasion of the MSB. However, since necessary pressing force (value fb1) required for the parking brake is determined based on the Fba, reliable braking torque can be given. Since the decelerator GSK is disposed between the rotating axis Jmt of the MTR and the central axis Jps of the PSN, a resolving power (resolution) at the pressing state quantity is higher on the rotating axis Jmt of the MTR than on the central axis Jps of the PSN. For this reason, since the interlocking state between the TSU and the RCH is confirmed based on the displacement Hm1 of the rotating angle Mka, the determination therefor can be reliably executed.

The invention claimed is:

1. An electric braking device for vehicle comprising:
   an electric motor disposed on a wheel side of a vehicle;
   a caliper disposed on the wheel side;
   a pressing member disposed on the caliper and pressing a friction member against a rotating member rotating integrally with the wheel;
   a power transmission member rotatably supported on the caliper and rotationally driven with the electric motor to drive the pressing member;
   a ratchet wheel fixed to the power transmission member;
   a pawl member which is disposed to be able to move along an axis in a first linear direction with reference to the caliper and can be interlocked with the ratchet wheel;
   a guide member serving as a part of the caliper or fixed to the caliper and guiding movement of the pawl member in the first linear direction;
   a solenoid having a fixed member fixed to the caliper and a movable member disposed to be able to move along the axis in the first linear direction with reference to the fixed member and engaged with the pawl member being independent of the movable member, the solenoid causing the movable member to press the pawl member in an on state in an interlocking direction in which the pawl member in the first linear direction comes close to the ratchet wheel; and
   an elastic member always pressing the pawl member in a release direction opposing the interlocking direction in the first linear direction, wherein
   an engagement portion between the pawl member and the movable member includes at least one protrusion and at least one recess which can be interlocked with each other, and
   a gap in which the pawl member and the movable member are fitted to each other is larger than a gap between the pawl member and the guide member.

2. The electric braking device for vehicle according to claim 1, comprising:
   a decelerator interposed in a power transmission path between the plurality of power transmission members and decelerating rotation of the electric motor, and
   the ratchet wheel is fixed to the power transmission member on a side close to the electric motor with reference to the decelerator in the plurality of power transmission members.

3. The electric braking device for vehicle according to claim 1, wherein
   with respect to a guide surface which is configured to guide movement of the pawl member in the first linear direction in the guide member,
   a length of the guide surface in the first linear direction on a side away from a free end of the pawl member is larger than a length of the guide surface in the first linear direction on a side close to the free end of the pawl member.

4. An electric braking device for vehicle comprising:
   an electric motor disposed on a wheel side of a vehicle;
   a caliper disposed on the wheel side;
   a pressing member disposed on the caliper and pressing a friction member against a rotating member rotating integrally with the wheel;
   a power transmission member rotatably supported on the caliper and rotationally driven with the electric motor to drive the pressing member;
   a ratchet wheel fixed to the power transmission member;
   a pawl member which is disposed to be able to move along an axis in a first linear direction with reference to the caliper and can be interlocked with the ratchet wheel;
   a guide member serving as a part of the caliper or fixed to the caliper and guiding movement of the pawl member in the first linear direction;
   a solenoid having a fixed member fixed to the caliper and a movable member disposed to be able to move along the axis in the first linear direction with reference to the fixed member and engaged with the pawl member being independent of the movable member, the solenoid causing the movable member to press the pawl member in an on state in an interlocking direction in which the pawl member in the first linear direction comes close to the ratchet wheel; and
   an elastic member always pressing the pawl member in a release direction opposing the interlocking direction in the first linear direction, wherein
   with respect to a guide surface which is configured to guide movement of the pawl member in the first linear direction in the guide member,
   a length of the guide surface in the first linear direction on a side away from a free end of the pawl member is larger than a length of the guide surface in the first linear direction on a side close to the free end of the pawl member.

5. The electric braking device for vehicle according to claim 4, comprising:
   a decelerator interposed in a power transmission path between the plurality of power transmission members and decelerating rotation of the electric motor, and the ratchet wheel is fixed to the power transmission member on a side close to the electric motor with reference to the decelerator in the plurality of power transmission members.

* * * * *